United States Patent
Kinoshita et al.

(10) Patent No.: US 10,788,715 B2
(45) Date of Patent: Sep. 29, 2020

(54) PHOTO-ALIGNMENT MATERIAL AND PHOTO-ALIGNMENT METHOD

(71) Applicants: TOKYO INSTITUTE OF TECHNOLOGY, Tokyo (JP); DIC CORPORATION, Tokyo (JP)

(72) Inventors: Motoi Kinoshita, Tokyo (JP); Atsushi Shishido, Tokyo (JP); Isa Nishiyama, Kita-adachi-gun (JP)

(73) Assignees: TOKYO INSTITUTE OF TECHNOLOGY, Tokyo (JP); DIC CORPORATION, Tokyo (JP)

( * ) Notice: Subject to any disclaimer, the term of this patent is extended or adjusted under 35 U.S.C. 154(b) by 0 days.

(21) Appl. No.: 16/196,016

(22) Filed: Nov. 20, 2018

(65) Prior Publication Data

US 2019/0086738 A1   Mar. 21, 2019

Related U.S. Application Data

(62) Division of application No. 14/911,097, filed as application No. PCT/JP2014/070747 on Aug. 6, 2014, now abandoned.

(30) Foreign Application Priority Data

Aug. 14, 2013   (JP) .................. 2013-168669

(51) Int. Cl.
*G02F 1/1337* (2006.01)
*C09K 19/56* (2006.01)
*C08F 2/48* (2006.01)
*C08L 101/00* (2006.01)
*G03H 1/02* (2006.01)

(52) U.S. Cl.
CPC .......... *G02F 1/133788* (2013.01); *C08F 2/48* (2013.01); *C08L 101/00* (2013.01); *C09K 19/56* (2013.01); *G02F 1/133711* (2013.01); *G03H 1/02* (2013.01); *G03H 2001/026* (2013.01); *Y10T 428/10* (2015.01); *Y10T 428/1005* (2015.01)

(58) Field of Classification Search
CPC ......... G02F 1/133788; G02F 1/133711; G02F 1/1337; G02F 1/133703; C08L 101/00; C08F 2/48; C09K 19/56; C09K 19/60; C03H 1/02; Y10T 428/10; Y10T 428/1005; Y10T 428/1036; Y10T 428/1042
USPC .......... 428/1.1, 1.2, 1.3, 1.31; 427/457, 508, 427/553; 252/299.1; 349/117, 123
See application file for complete search history.

(56) References Cited

U.S. PATENT DOCUMENTS

| | | | |
|---|---|---|---|
| 2005/0146670 A1 | 7/2005 | Helgee et al. | |
| 2009/0269513 A1* | 10/2009 | Nishiyama | C09D 4/00 428/1.2 |
| 2010/0314995 A1 | 12/2010 | Ikeda et al. | |

FOREIGN PATENT DOCUMENTS

| | | |
|---|---|---|
| JP | 7-146409 A | 6/1995 |
| JP | 7-294735 A | 11/1995 |
| JP | 8-3111 A | 1/1996 |
| JP | 8-29618 A | 2/1996 |
| JP | 11-80090 A | 3/1999 |
| JP | 11-148079 A | 6/1999 |
| JP | 2000-178233 A | 6/2000 |
| JP | 2002-145830 A | 5/2002 |
| JP | 2002-308831 A | 10/2002 |
| JP | 2004-2373 A | 1/2004 |
| JP | 2004-99446 A | 4/2004 |
| JP | 2004-149522 A | 5/2004 |
| JP | 2005-284175 A | 10/2005 |
| JP | 2007-240628 A | 9/2007 |

OTHER PUBLICATIONS

International Search Report dated Oct. 28, 2014, issued in counterpart International Application No. PCT/JP2014/070747.
Jánossy et al., "Anamalous Optical Freedericksz Transition in an Absorbing Liquid Crystal", Mol. Cryst. Liq. Cryst., 1990, pp. 1-12, vol. 179, cited in the Specification.
Demus et al., "High Molecular Weight Liquid Crystals", Handbook of Liquid Crystals, Wiley-VCH, 1998, vol. 3, cited in the Specification.
Kikan Kagaku Sosetsu, "Liquid Crystal Chemistry", The Chemical Society of Japan, 1994, No. 22, cited in the Specification.
Matsuura et al., "Oligothiophene Yudotai no Hikari Butsuri Process o Sado Genri to suru Shinki Hologram Zairyo no Sosei", Polymer Preprints, Japan, Sep. 13, 2011, pp. 3260-3261 (3J12), vol. 60, No. 2, Disk 1, cited in the ISR.
Non-Final Office Action dated Aug. 13, 2018, issued in U.S. Appl. No. 14/911,097.

* cited by examiner

Primary Examiner — Ruiyun Zhang
(74) Attorney, Agent, or Firm — Westerman, Hattori, Daniels & Adrian, LLP

(57) ABSTRACT

A photo-alignment material in which an alignment film can be formed parallel to a vibration direction of light and a tilt angle of the alignment film is easily controlled and a photo-alignment method using the photo-alignment material are provided. A photo-alignment material of the present invention contains a photo-responsive substance having a threshold value of responding light intensity.

6 Claims, No Drawings

PHOTO-ALIGNMENT MATERIAL AND PHOTO-ALIGNMENT METHOD

CROSS-REFERENCE TO RELATED APPLICATIONS

This application is a divisional of U.S. application Ser. No. 14/911,097, filed on Feb. 9, 2016, which is a 371 of International Application No. PCT/JP2014/070747, filed on Aug. 6, 2014, which is based upon and claims the benefit of priority from the prior Japanese Patent Application No. 2013-168669, filed on Aug. 14, 2013.

BACKGROUND OF THE INVENTION

Field of the Invention

The present invention relates to a photo-alignment material and a photo-alignment method using the photo-alignment material.

Description of Related Art

A liquid crystal is a high-functional material having fluidity and high refractive index anisotropy, and has self-organizability and a cooperative effect which are not seen in other materials. Further, in the liquid crystal, it is possible to freely control molecular arrangement by a substrate surface treatment or an external field. For example, an alignment film represented by polyimide or a silane coupling agent is formed on the surface of the substrate, and thus, liquid crystal molecules can be arranged parallel to or perpendicular to the substrate. In addition, when an electric field is used as the external field, an alignment change is performed by applying a voltage such that the liquid crystal molecules which have been arranged parallel to the substrate are arranged perpendicular to the substrate. Therefore, dynamic alignment control of the liquid crystal molecules can be performed. A method of controlling the alignment has been widely used as an operating principle of current liquid crystal displays.

In order to use the liquid crystal in a liquid crystal display, a liquid crystal memory element, or the like, a technology of controlling the alignment of the liquid crystal is important. Currently, initial alignment of the liquid crystal is controlled by the alignment film represented by rubbing polyimide. Then, alignment driving of the liquid crystal is controlled by the electric field.

In the related art, a method has been used in which an alignment film is formed by a photochemical process of irradiating a film formed by using an azo compound with light and of allowing the film to exhibit liquid crystal alignment properties.

On the other hand, a photophysical control method (the Janossy effect, hereinafter, referred to as a "photophysical process") based on a mutual interaction between excitation polarization of a dye such as anthraquinone and a photoelectric field is known as a technology of controlling the alignment by using light (for example, refer to NPL 1).

The photochemical process and the photophysical process are significantly different from each other in that the photochemical process is a method using a linear optical effect in which a response is indicated even with respect to extremely weak light, whereas the photophysical process is a method using a non-linear optical effect.

[NPL 1] Janossy I. et al. Mol. Cryst. Liq. Cryst., 1990, 179, 1.

SUMMARY OF THE INVENTION

When the alignment film is formed by using the photochemical process, the alignment film is aligned perpendicular to a vibration direction of light, and thus, an alignment film having a desired tilt angle cannot be obtained.

The present invention has been made in consideration of the circumstances described above, and an object of the present invention is to provide a photo-alignment material in which an alignment film or an optical anisotropic body can be formed by a photophysical process, and a tilt angle of the alignment film or the optical anisotropic body is easily controlled, and a photo-alignment method using the photo-alignment material.

The present inventors have found that an alignment film or an optical anisotropic body is formed by using a photo-alignment material containing a photo-responsive substance having a threshold value of responding light intensity, and thus, the alignment film or the optical anisotropic body can be formed by a photophysical process, and a tilt angle of the alignment film can be controlled, and have completed the present invention.

That is, the present invention provides a photo-alignment material containing a photo-responsive substance having a threshold value of responding light intensity.

In addition, the present invention provides a photo-alignment method of irradiating a photo-alignment material containing a photo-responsive substance having a threshold value of responding light intensity with light having a light intensity of greater than or equal to the threshold value.

According to the present invention, an alignment film or an optical anisotropic body can be formed by using a photophysical process, and a tilt angle of the alignment film can be controlled.

DESCRIPTION OF EMBODIMENTS

Embodiments of a photo-alignment material and a photo-alignment method of the present invention will be described.

Furthermore, this embodiment will be specifically described in order to allow the gist of the present invention to be easily understood, but the present invention is not limited to this embodiment, unless otherwise particularly stated.

[Photo-Alignment Material]

A photo-alignment material of the present invention contains a photo-responsive substance having a threshold value of responding light intensity.

A compound having a threshold value of responding light intensity is used as the photo-responsive substance. Specifically, the photo-responsive substance is not particularly limited insofar as the photo-responsive substance has a molecular structure having anisotropy in absorption with respect to light. As a photo-responsive substance, in which even when a photochemical reaction is caused or is not caused, it is preferable that the influence of the reaction with respect to alignment of an anisotropic substance be small, and for example, a compound is used in which even when light in a visible light region or a region other than the visible light region is irradiated, a threshold value is obtained in responding light intensity by absorbing the light.

In the present invention, the means that the photo-responsive substance responds when irradiated with the light indicates that the photo-responsive substance is aligned at the time of being irradiated with the light. More specifically, the photo-responsive substance being aligned indicates that a long axis direction of the photo-responsive substance is aligned parallel to a vibration direction of the light (an electric field vector of polarized light).

In order to further decrease light intensity (light energy) to be irradiated, it is preferable that a threshold value (the minimum value) of necessary light intensity further decrease, and for example, the threshold value be preferably less than or equal to 10 W/cm$^2$, more preferably less than or equal to 5 W/cm$^2$, and even more preferably less than or equal to 1 W/cm$^2$. In addition, in order to control the photo-responsive substance such that the photo-responsive substance is aligned in specific light intensity, it is preferable that the threshold value of the necessary light intensity be adjusted to be in a specific range. Furthermore, the threshold value of the necessary light intensity indicates the minimum value of light intensity which is necessary for the alignment of the photo-responsive substance.

A dichromatic dye is used as such a photo-responsive substance, for example, as a photo-responsive substance responding to light in a visible light region. The dichromatic dye is not particularly limited, and examples of the dichromatic dye include an anthraquinone-based dye, a merocyanine-based dye, a styryl-based dye, an azomethine-based dye, a quinone-based dye, a quinophthalone-based dye, a perylene-based dye, an indigo-based dye, a tetrazine-based dye, a stilbene-based dye, a benzidine-based dye, and the like. In addition, oligothiophene is also preferably used.

Examples of the photo-responsive substance include an oligothiophene-based compound denoted by General Formula (I-1) shown below.

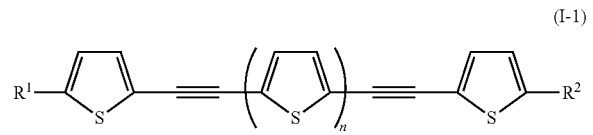

(I-1)

(In the formula, R$^1$ and R$^2$ each independently represent a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO$_2$), one or more CH$_2$ groups of the alkyl group may be substituted with —O—, —CO—, —OCO—, or —COO— in the manner that oxygen atoms are not directly adjacent to each other, one or more hydrogen atoms of the alkyl group, the alkenyl group, the alkynyl group, and the alkoxy group may be arbitrarily substituted with a halogen atom, and n represents 1 to 8.)

R$^1$ and R$^2$ each independently preferably represent an alkyl group having 1 to 10 carbon atoms (—C$_n$H$_{2n+1}$), —OC$_n$H$_{2n+1}$, —N(C$_n$H$_{2n+1}$)$_2$, —COOC$_n$H$_{2n+1}$, a cyano group (—CN), and a nitro group (—NO$_2$), and more preferably represent an alkyl group having 2 to 5 carbon atoms (—C$_n$H$_{2n+1}$), —OC$_n$H$_{2n+1}$, —N(C$_n$H$_{2n+1}$)$_2$, and —COOC$_n$H$_{2n+1}$.

n is preferably 1 to 5, and more preferably 1 to 3.

It is preferable that General Formula (I-1) described above be a compound denoted by General Formula (I-2) shown below.

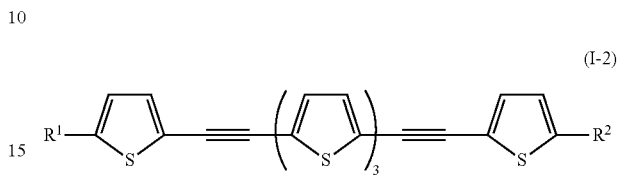

(I-2)

(In the formula, R$^1$ and R$^2$ are identical to R$^1$ and R$^2$ of General Formula (I-1) described above.)

Specifically, examples of the compound denoted by General Formula (I-2) described above include a compound denoted by shown below General Formula (I-3) as a compound having symmetry,

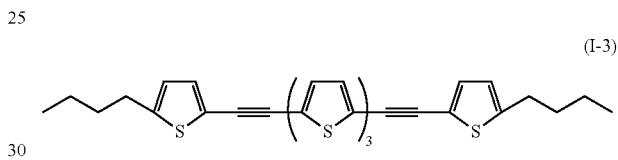

(I-3)

a compound denoted by General Formula (I-4) shown below, or

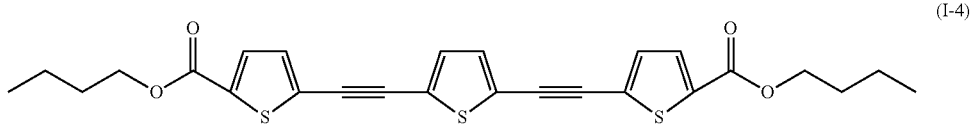

(I-4)

a compound of which R$^1$ and R$^2$ each represent —C$_4$H$_9$, —OC$_4$H$_9$, —N(C$_4$H$_9$)$_2$, —COOC$_4$H$_9$, and —CN.

In addition, Examples of the compound denoted by above General Formula (I-2) described above include a compound of which R$^1$ represents —C$_4$H$_9$ or —N(C$_4$H$_9$)$_2$, and R$^2$ represents —CN or —NO$_2$ as a compound having asymmetry.

In addition, examples of the compound denoted by General Formula (I-1) described above include a compound denoted by General Formula (I-5) shown below, and

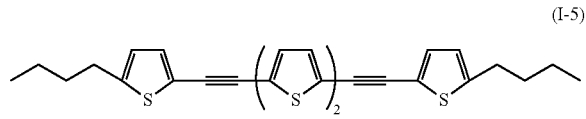

(I-5)

an uncolored compound denoted by General Formula (I-6) shown below.

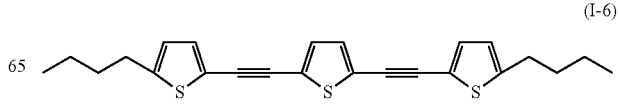

(I-6)

In addition, examples of the oligothiophene-based compound include a compound denoted by General Formula (I-7) shown below.

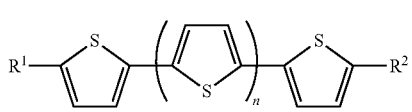
(I-7)

(In the formula, $R^1$ and $R^2$ are identical to $R^1$ and $R^2$ of General Formula (I-1) described above, and n represents 0 or 1.)

Examples of the compound denoted by General Formula (I-7) described above include a compound denoted by General Formula (I-8) shown below.

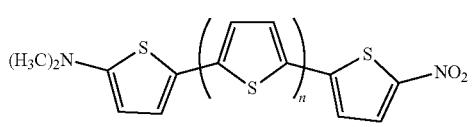
(I-8)

(In the formula, n represents 0 or 1.)

In addition, examples of the photo-responsive substance include a compound denoted by General Formula (I-9) shown below.

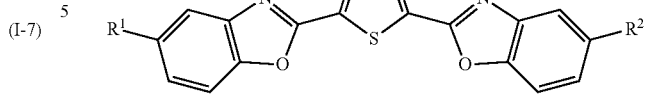
(I-9)

(In the formula, $R^1$ and $R^2$ are identical to $R^1$ and $R^2$ of General Formula (I-1) described above.)

Examples of the compound denoted by General Formula (I-9) described above include a compound denoted by General Formula (I-10) shown below.

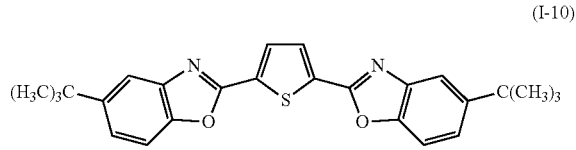
(I-10)

In addition, examples of the photo-responsive substance include a compound denoted by General Formula (I-11) shown below.

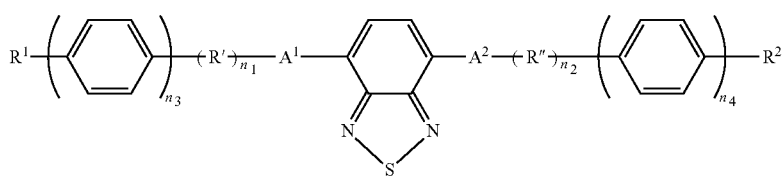
(I-11)

(In the formula, $A^1$ and $A^2$ each independently represent a 1,4-phenylene group, a 2,5-thiophene group, and a naphthalene-2,6-diyl group; R' and R'' each independently represent a —CH═CH— group and a —C≡C— group; $R^1$ and $R^2$ are identical to $R^1$ and $R^2$ of General Formula (I-1) described above; $n_1$ and $n_2$ each independently represent 0 to 8; and $n_3$ and $n_4$ each independently represent 0 or 1.)

$n_1$ and $n_2$ are preferably 0 to 6, and are more preferably 0 to 4.

Specifically, examples of the compound denoted by General Formula (I-11) described above include compounds denoted by General Formula (I-12) to General Formula (I-19) shown below.

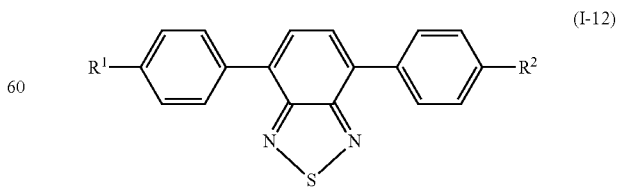
(I-12)

(In the formula, $R^1$ and $R^2$ are identical to $R^1$ and $R^2$ of General Formula (I-1) described above.)

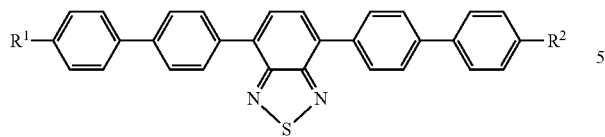

(In the formula, $R^1$ and $R^2$ are identical to $R^1$ and $R^2$ of General Formula (I-1) described above.)

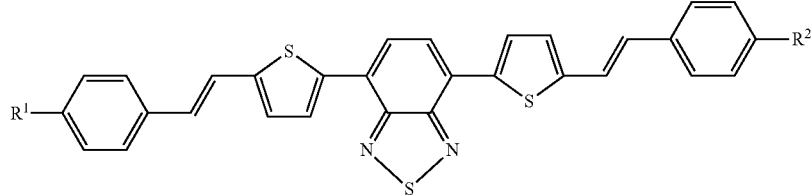

(In the formula, $R^1$ and $R^2$ are identical to $R^1$ and $R^2$ of General Formula (I-1) described above.)

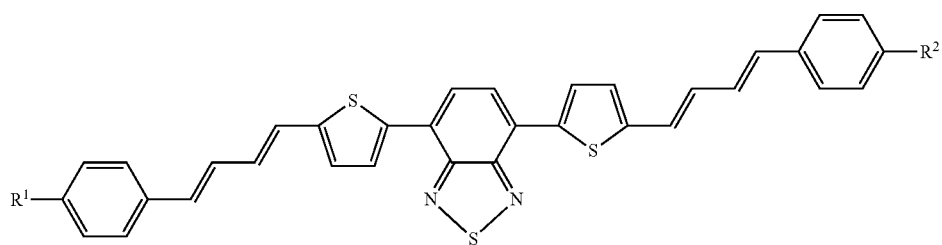

(In the formula, $R^1$ and $R^2$ are identical to $R^1$ and $R^2$ of General Formula (I-1) described above.)

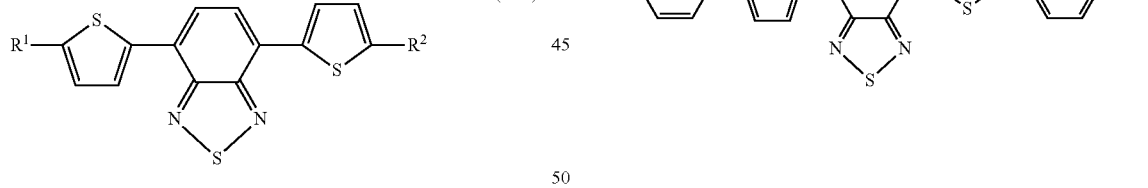

(In the formula, $R^1$ and $R^2$ are identical to $R^1$ and $R^2$ of General Formula (I-1) described above.)

(In the formula, $R^1$ and $R^2$ are identical to $R^1$ and $R^2$ of General Formula (I-1) described above.)

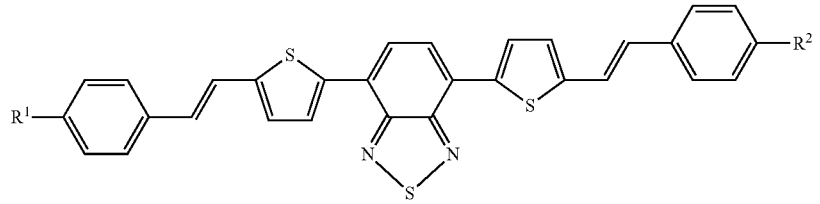

(In the formula, $R^1$ and $R^2$ are identical to $R^1$ and $R^2$ of General Formula (I-1) described above.)

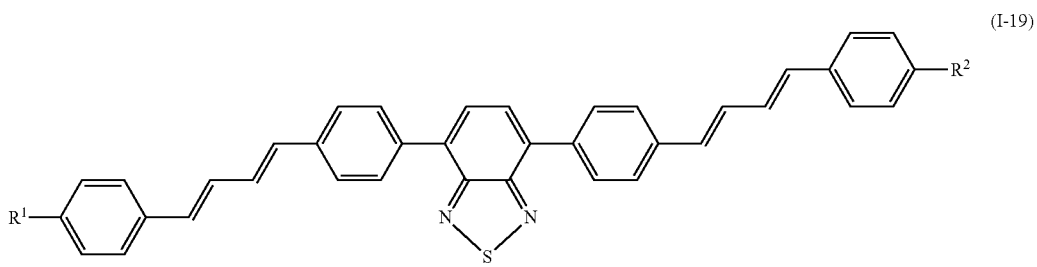
(I-19)

(In the formula, R¹ and R² are identical to R¹ and R² of General Formula (I-1) described above.)

In addition, examples of the photo-responsive substance include a coumarin-based compound denoted by General Formula (I-20) shown below.

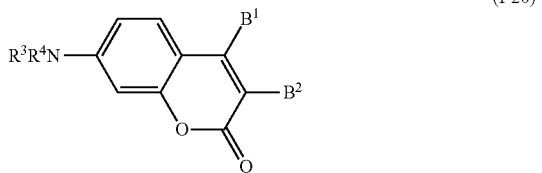
(I-20)

(In the formula, R³ and R⁴ each independently represent a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO₂), one or more CH₂ groups of the alkyl group may be substituted with —O—, —CO—, —OCO—, or —COO— in the manner that oxygen atoms are not directly adjacent to each other, and one or more hydrogen atoms of the alkyl group, the alkenyl group, the alkynyl group, and the alkoxy group may be arbitrarily substituted with a halogen atom; and B¹ and B² each independently represent a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), a nitro group (—NO₂), a phenyl group which may have a substituent group (one or more —C═ existing in the group may be substituted with —N═), a naphthyl group which may have a substituent group, a cyclohexyl group which may have a substituent group (one or more —C— existing in the group may be substituted with —O— or —S—), and any one group of General Formula (a), (b), or (c) shown below, one or more CH₂ groups of the alkyl group may be substituted with —O—, —CO—, —OCO—, or —COO— in the manner that oxygen atoms are not directly adjacent to each other, and one or more hydrogen atoms of the alkyl group, the alkenyl group, the alkynyl group, and the alkoxy group may be arbitrarily substituted with a halogen atom.)

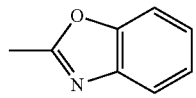
(a)

-continued

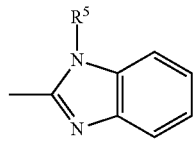
(b)

(c)

(In the formula, R⁵ represents a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO₂), one or more CH₂ groups of the alkyl group may be substituted with —O—, —CO—, —OCO—, or —COO— in the manner that oxygen atoms are not directly adjacent to each other, one or more hydrogen atoms of the alkyl group, the alkenyl group, the alkynyl group, and the alkoxy group may be arbitrarily substituted with a halogen atom.)

When R³ and R⁴ represent an alkyl group, an alkyl group having 1 to 10 carbon atoms is preferable, and an alkyl group having 1 to 5 carbon atoms is more preferable, and when B¹ and B² represent an alkyl group, an alkyl group having 1 to 10 carbon atoms is preferable, and an alkyl group having 1 to 5 carbon atoms is more preferable.

Examples of the compound denoted by General Formula (I-20) described above include compounds denoted by General Formula (I-22) to General Formula (I-24) shown below.

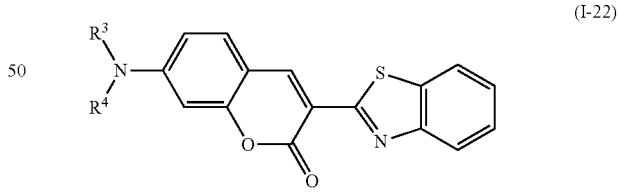
(I-22)

(In the formula, R³ and R⁴ are identical to R³ and R⁴ of General Formula (I-20) described above.)

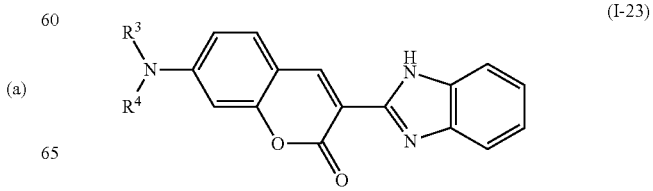
(I-23)

(In the formula, $R^3$ and $R^4$ are identical to $R^3$ and $R^4$ of General Formula (I-20) described above.)

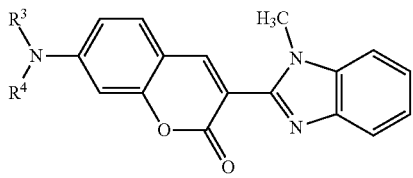
(I-24)

(In the formula, $R^3$ and $R^4$ are identical to $R^3$ and $R^4$ of General Formula (I-20) described above.)

In addition, examples of the coumarin-based compound include a compound denoted by General Formula (I-25) shown below.

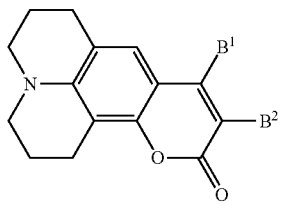
(I-25)

(In the formula, $B^1$ and $B^2$ are identical to $B^1$ and $B^2$ of General Formula (I-20) described above.)

When $B^1$ and $B^2$ represent an alkyl group, an alkyl group having 1 to 10 carbon atoms is preferable, and an alkyl group having 1 to 5 carbon atoms is more preferable.

Examples of the compound denoted by General Formula (I-25) described above include compounds denoted by General Formula (I-26) to General Formula (I-30) shown below.

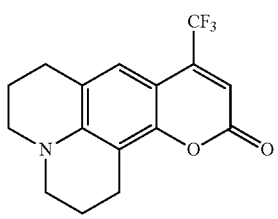
(I-26)

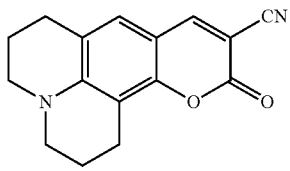
(I-27)

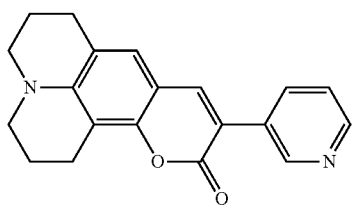
(I-28)

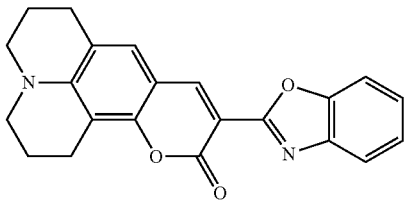
(I-29)

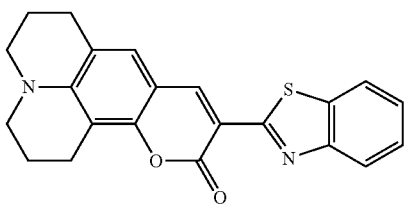
(I-30)

In addition, examples of the photo-responsive substance include a compound denoted by General Formula (I-31) shown below.

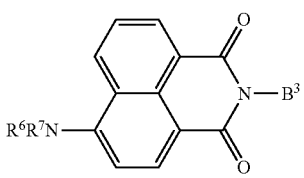
(I-31)

(In the formula, $R^6$ and $R^7$ each independently represent a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO$_2$), one or more CH$_2$ groups of the alkyl group may be substituted with —O—, —CO—, —OCO—, or —COO— in the manner that oxygen atoms are not directly adjacent to each other, and one or more hydrogen atoms of the alkyl group, the alkenyl group, the alkynyl group, and the alkoxy group may be arbitrarily substituted with a halogen atom, and $B^3$ represents a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), a nitro group (—NO$_2$), a phenyl group which may have a substituent group (one or more —C═ existing in the group may be substituted with —N═), a naphthyl group which may have a substituent group, a cyclohexyl group which may have a substituent group (one or more —C— existing in the group may be substituted with —O— or —S—), one or more CH$_2$ groups of the alkyl group may be substituted with —O—, —CO—, —OCO—, or —COO— in the manner that oxygen atoms are not directly adjacent to each other, and one or more hydrogen atoms of the alkyl group, the alkenyl group, the alkynyl group, and the alkoxy group may be arbitrarily substituted with a halogen atom.)

When $R^6$, $R^7$, and $B^3$ each independently represent an alkyl group, an alkyl group having 1 to 10 carbon atoms is preferable, and an alkyl group having 1 to 5 carbon atoms is more preferable. In addition, when $R^6$, $R^7$, and $B^3$ each independently represent an alkenyl group, an alkenyl group having 2 to 10 carbon atoms is preferable, and an alkenyl group having 2 to 5 carbon atoms is more preferable. In addition, $B^3$ is preferably a phenyl group which may have a substituent group, and an alkyl group having 1 to 14 carbon atoms, an alkenyl group having 2 to 14 carbon atoms, and an alkoxy group having 1 to 14 carbon atoms are preferable as the substituent group, and an alkyl group having 1 to 10 carbon atoms, an alkenyl group having 2 to 10 carbon atoms, and an alkoxy group having 1 to 10 carbon atoms are more preferable.

Examples of the compound denoted by General Formula (I-31) described above include a compound denoted by General Formula (I-32) shown below, and

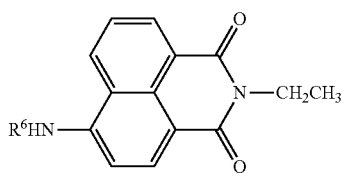

(I-32)

(In the formula, $R^6$ is identical to $R^6$ of General Formula (I-31) described above.)

a compound denoted by General Formula (I-33) shown below.

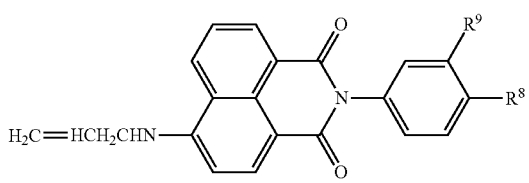

(I-33)

(In the formula, $R^8$ and $R^9$ each independently represent a hydrogen atom, or an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO$_2$), one or more CH$_2$ groups of the alkyl group may be substituted with —O—, —CO—, —OCO—, or —COO— in the manner that oxygen atoms are not directly adjacent to each other, and one or more hydrogen atoms of the alkyl group, the alkenyl group, the alkynyl group, and the alkoxy group may be arbitrarily substituted with a halogen atom.)

In addition, examples of the photo-responsive substance include a compound denoted by General Formula (I-34) shown below.

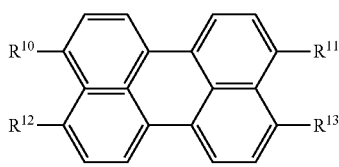

(I-34)

(In the formula, $R^{10}$ to $R^{13}$ each independently represent a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO$_2$), one or more CH$_2$ groups of the alkyl group may be substituted with —O—, —CO—, —OCO—, or —COO— in the manner that oxygen atoms are not directly adjacent to each other, and one or more hydrogen atoms of the alkyl group, the alkenyl group, the alkynyl group, and the alkoxy group may be arbitrarily substituted with a halogen atom.)

$R^{10}$ to $R^{13}$ each independently preferably represent a hydrogen atom and an alkyl group having 1 to 10 carbon atoms in which a CH$_2$ group of an alkyl group is substituted with —COO— or —OCO—, and more preferably represent a hydrogen atom and an alkyl group having 1 to 5 carbon atoms in which a CH$_2$ group of an alkyl group is substituted with —COO— or —OCO—.

Examples of the compound denoted by General Formula (I-34) described above include a compound denoted by General Formula (I-35) shown below, and

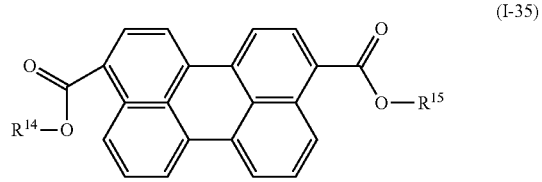

(I-35)

(In the formula, $R^{14}$ and $R^{15}$ each independently represent a hydrogen atom or an alkyl group having 1 to 10 carbon atoms.)

a compound denoted by General Formula (I-36) shown below.

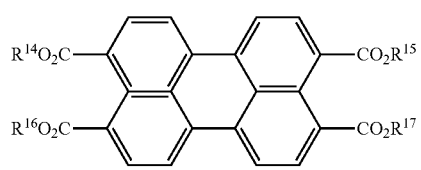

(I-36)

(In the formula, $R^{14}$ to $R^{17}$ each independently represent a hydrogen atom or an alkyl group having 1 to 10 carbon atoms.)

In addition, examples of the photo-responsive substance include a compound denoted by General Formula (I-37) shown below.

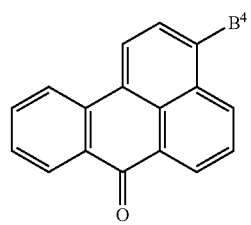

(I-37)

(In the formula, $B^4$ represents a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), a nitro group (—$NO_2$), a phenyl group which may have a substituent group (one or more —C═ existing in the group may be substituted with —N═), a naphthyl group which may have a substituent group, a cyclohexyl group which may have a substituent group (one or more —C— existing in the group may be substituted with —O— or —S—), and $NR^{18}R^{19}$ ($R^{18}$ and $R^{19}$ each independently represent a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—$NO_2$), one or more $CH_2$ groups of the alkyl group may be substituted with —O—, —CO—, —OCO—, or —COO— or a 1,4-phenylene group in the manner that oxygen atoms are not directly adjacent to each other, and one or more hydrogen atoms of the alkyl group, the alkenyl group, the alkynyl group, and the alkoxy group may be arbitrarily substituted with a halogen atom).)

An alkyl group having 1 to 14 carbon atoms, an alkenyl group having 2 to 14 carbon atoms which may have a substituent group, and a phenyl group are preferable as $R^{18}$ and $R^{19}$ of General Formula (I-37).

Examples of the compound denoted by General Formula (I-37) described above include a compound denoted by General Formula (I-38) shown below,

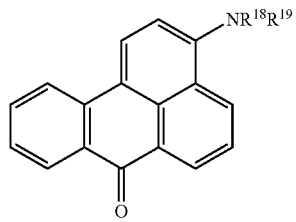

(I-38)

(In the formula, $R^{18}$ and $R^{19}$ are identical to $R^{18}$ and $R^{19}$ of General Formula (I-37) described above.)

a compound denoted by General Formula (I-39) shown below, and

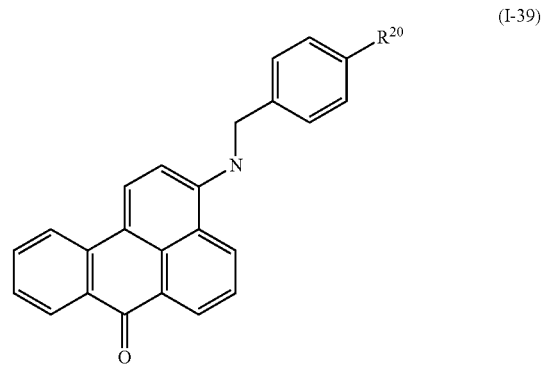

(I-39)

(In the formula, $R^{20}$ represents a hydrogen atom or an alkyl group having 1 to 14 carbon atoms.)

a compound denoted by General Formula (I-40) shown below.

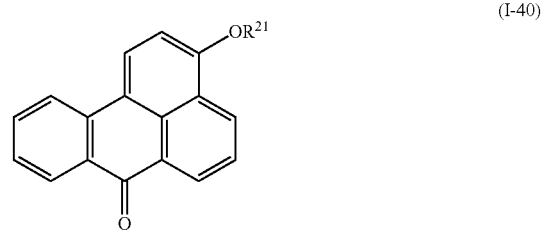

(I-40)

(In the formula, $R^{21}$ represents a hydrogen atom or an alkyl group having 1 to 14 carbon atoms.)

In addition, examples of the photo-responsive substance include a dioxazine-based compound denoted by General Formula (I-41) shown below.

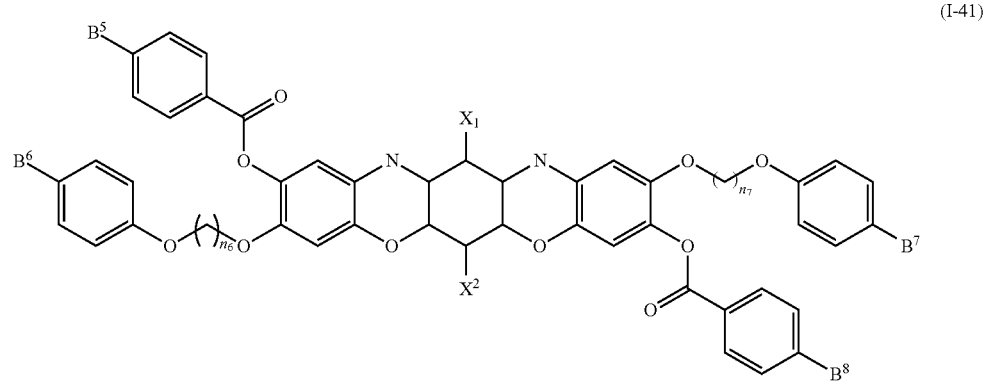

(I-41)

(In the formula, $X^1$ and $X^2$ each independently represent a hydrogen atom, a fluorine atom, or a chlorine atom; and $B^5$ to $B^8$ each independently represent a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), a nitro group (—NO$_2$), a phenyl group which may have a substituent group (one or more —C═ existing in the group may be substituted with —N═), a naphthyl group which may have a substituent group, and a cyclohexyl group which may have a substituent group (one or more —C— existing in the group may be substituted with —O— or —S—), one or more CH$_2$ groups of the alkyl group may be substituted with —O—, —CO—, —OCO—, or —COO— in the manner that oxygen atoms are not directly adjacent to each other, one or more hydrogen atoms of the alkyl group, the alkenyl group, the alkynyl group, and the alkoxy group may be arbitrarily substituted with a halogen atom, and $n_6$ and $n_7$ each independently represent 1 to 14.)

$B^5$ to $B^8$ each independently preferably represent an alkyl group having 1 to 10 carbon atoms, an alkoxy group having 1 to 10 carbon atoms, a phenyl group which may have a substituent group, and a cyclohexyl group which may have a substituent group, and an alkyl group having 1 to 10 carbon atoms and an alkoxy group having 1 to 10 carbon atoms are preferable as the substituent group.

Examples of the compound denoted by General Formula (I-41) described above include a compound denoted by General Formula (I-42) shown below, and

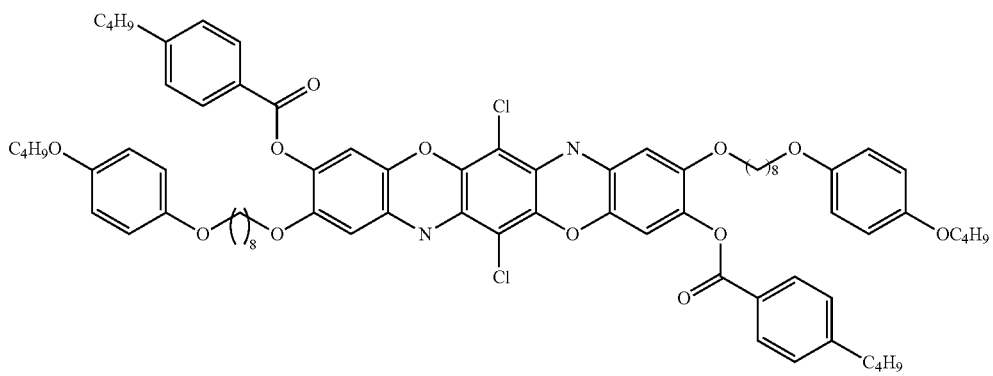

(I-42)

a compound denoted by General Formula (I-43) shown below.

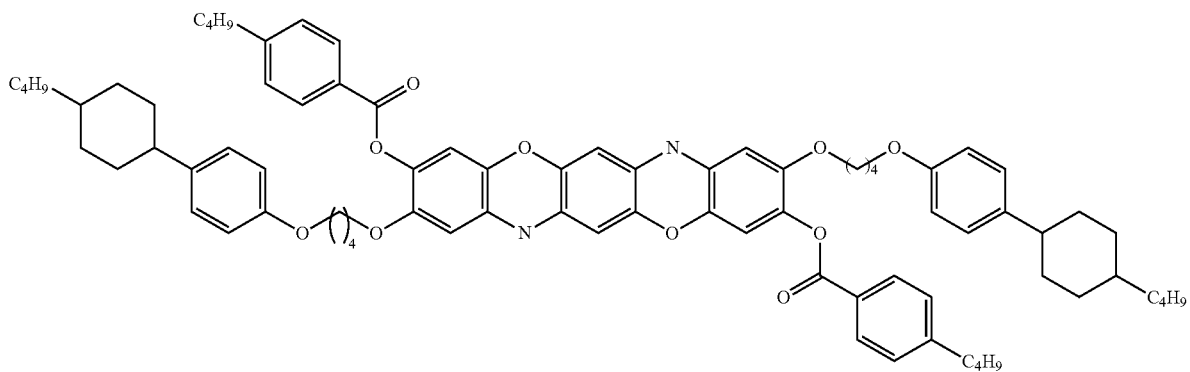

(I-43)

In addition, examples of the photo-responsive substance include an anthraquinone-based compound denoted by General Formula (I-44) shown below.

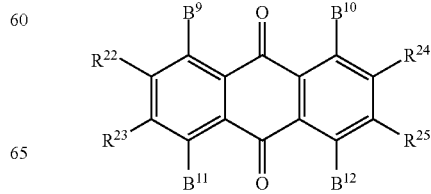

(I-44)

(In the formula, $B^9$ to $B^{12}$ each independently represent a hydrogen atom, a hydroxy group, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), a nitro group (—NO$_2$), a phenyl group which may have a substituent group (one or more —C═ existing in the group may be substituted with —N═), a naphthyl group which may have a substituent group, a cyclohexyl group which may have a substituent group (one or more —C— existing in the group may be substituted with —O— or —S—), and NR$^{18}$R$^{19}$ (R$^{18}$ and R$^{19}$ each independently represent a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO$_2$), one or more CH$_2$ groups of the alkyl group may be substituted with —O—, —CO—, —OCO—, or —COO— or a 1,4-phenylene group in the manner that oxygen atoms are not directly adjacent to each other, and one or more hydrogen atoms of the alkyl group, the alkenyl group, the alkynyl group, and the alkoxy group may be arbitrarily substituted with a halogen atom); and $R^{22}$ to $R^{25}$ each independently represent a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO$_2$), one or more CH$_2$ groups of the alkyl group may be substituted with —O—, —CO—, —OCO—, or —COO— in the manner that oxygen atoms are not directly adjacent to each other, and one or more hydrogen atoms of the alkyl group, the alkenyl group, the alkynyl group, and the alkoxy group may be arbitrarily substituted with a halogen atom.)

Examples of the compound denoted by General Formula (I-44) described above include a compound denoted by General Formula (I-45) shown below,

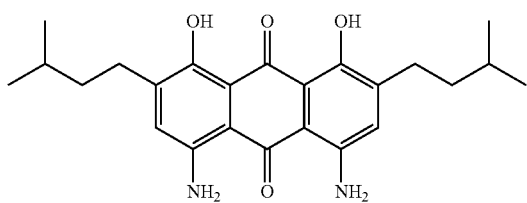

(I-45)

a compound denoted by General Formula (I-46) shown below, and

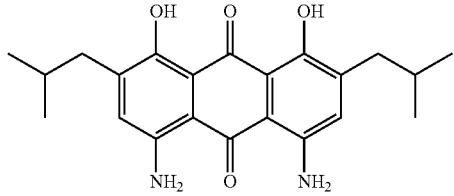

(I-46)

a compound denoted by General Formula (I-47) shown below.

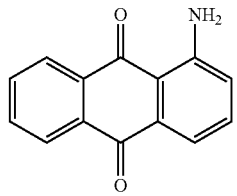

(I-47)

In addition, examples of the anthraquinone-based compound include a compound denoted by General Formula (I-48) shown below.

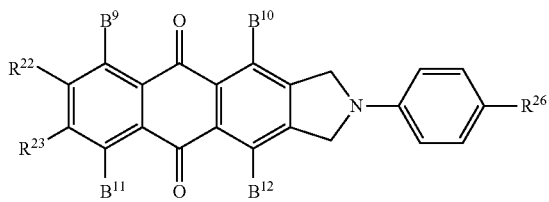

(I-48)

(In the formula, $B^9$ to $B^{12}$ are each independently identical to $B^9$ to $B^{12}$ of General Formula (I-44) described above; and $R^{22}$, $R^{23}$, and $R^{26}$ each independently represent a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO$_2$), one or more CH$_2$ groups of the alkyl group may be substituted with —O—, —CO—, —OCO—, or —COO— in the manner that oxygen atoms are not directly adjacent to each other, and one or more hydrogen atoms of the alkyl group, the alkenyl group, the alkynyl group, and the alkoxy group may be arbitrarily substituted with a halogen atom.)

Examples of the compound denoted by General Formula (I-48) described above include a compound denoted by General Formula (I-49) shown below.

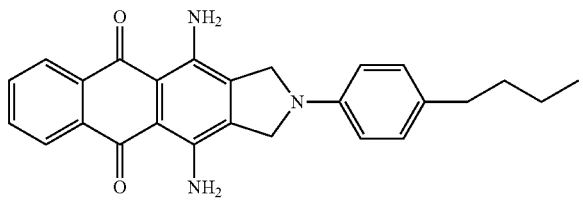

(I-49)

Further, examples of the photo-responsive substance include a compound denoted by General Formula (I-50) shown below,

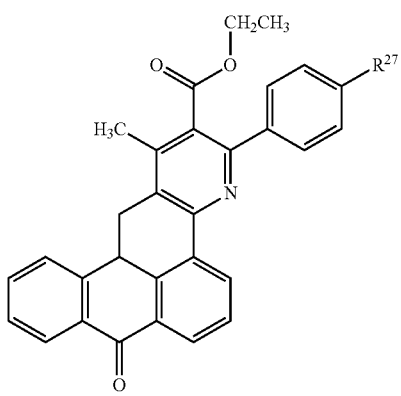

(I-50)

(In the formula, $R^{27}$ represents a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO$_2$), one or more CH$_2$ groups of the alkyl group may be substituted with —O—, —CO—, —OCO—, or —COO— in the manner that oxygen atoms are not directly adjacent to each other, and one or more hydrogen atoms of the alkyl group, the alkenyl group, the alkynyl group, and the alkoxy group may be arbitrarily substituted with a halogen atom.)

a compound denoted by General Formula (I-51) shown below,

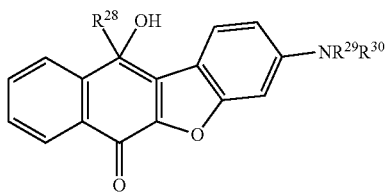

(I-51)

(In the formula, $R^{28}$ to $R^{30}$ each independently represent a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO$_2$), one or more CH$_2$ groups of the alkyl group may be substituted with —O—, —CO—, —OCO—, or —COO— in the manner that oxygen atoms are not directly adjacent to each other, and one or more hydrogen atoms of the alkyl group, the alkenyl group, the alkynyl group, and the alkoxy group may be arbitrarily substituted with a halogen atom.)

a compound denoted by General Formula (I-52) shown below,

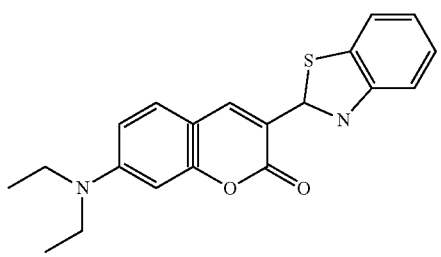

(I-52)

a compound denoted by General Formula (I-53) shown below,

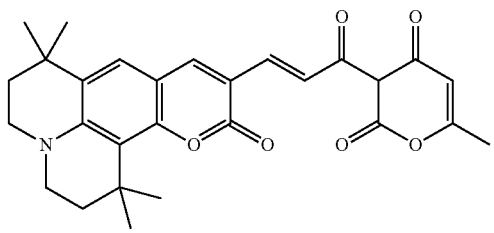

(I-53)

a compound denoted by General Formula (I-54) shown below,

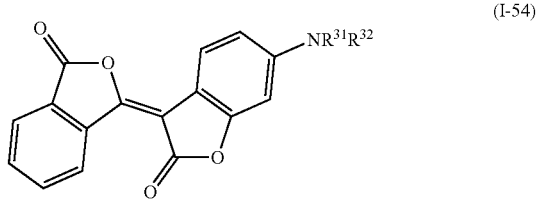

(I-54)

(In the formula, $R^{31}$ and $R^{32}$ each independently represent a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO$_2$), one or more CH$_2$ groups of the alkyl group may be substituted with —O—, —CO—, —OCO—, or —COO— in the manner that oxygen atoms are not directly adjacent to each other, and one or more hydrogen atoms of the alkyl group, the alkenyl group, the alkynyl group, and the alkoxy group may be arbitrarily substituted with a halogen atom.)

a compound denoted by General Formula (I-55) shown below,

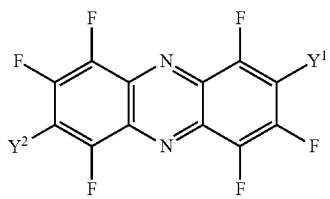

(I-55)

(In the formula, $Y^1$ and $Y^2$ each independently represent a hydrogen atom, a fluorine atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO$_2$), one or more CH$_2$ groups of the alkyl group may be substituted with —O—, —CO—, —OCO—, or —COO— in the manner that oxygen atoms are not directly adjacent to each other, and one or more hydrogen atoms of the alkyl group, the alkenyl group, the alkynyl group, and the alkoxy group may be arbitrarily substituted with a halogen atom.)

a compound denoted by General Formula (I-56) shown below, and

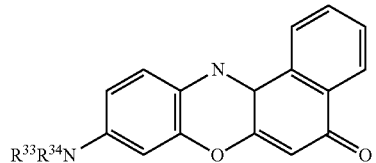
(I-56)

(In the formula, $R^{33}$ and $R^{34}$ each independently represent a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO$_2$), one or more CH$_2$ groups of the alkyl group may be substituted with —O—, —CO—, —OCO—, or —COO— in the manner that oxygen atoms are not directly adjacent to each other, and one or more hydrogen atoms of the alkyl group, the alkenyl group, the alkynyl group, and the alkoxy group may be arbitrarily substituted with a halogen atom.)

a compound denoted by General Formula (I-57) shown below.

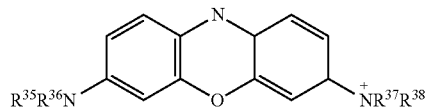
(I-57)

(In the formula, $R^{35}$ to $R^{38}$ each independently represent a hydrogen atom, an alkyl group having 1 to 14 carbon atoms, an alkenyl group having 2 to 14 carbon atoms, an alkynyl group having 2 to 14 carbon atoms, an alkoxy group having 1 to 14 carbon atoms, a cyano group (—CN), and a nitro group (—NO$_2$), one or more CH$_2$ groups of the alkyl group may be substituted with —O—, —CO—, —OCO—, or —COO— in the manner that oxygen atoms are not directly adjacent to each other, and one or more hydrogen atoms of the alkyl group, the alkenyl group, the alkynyl group, and the alkoxy group may be arbitrarily substituted with a halogen atom.)

In General Formula (I-51), General Formula (I-54), General Formula (I-56), and General Formula (I-57) described above, $R^{28}$ to $R^{38}$ are preferably an alkyl group having 1 to 10 carbon atoms and an alkenyl group having 2 to 10 carbon atoms, and are more preferably an alkyl group having 1 to 5 carbon atoms and an alkenyl group having 2 to 5 carbon atoms.

Specifically, examples of the compound denoted by General Formula (I-56) described above include a compound in which $R^{33}$ and $R^{34}$ each represent a C$_2$H$_5$ group.

In addition, specifically, examples of the compound denoted by General Formula (I-57) described above include a compound in which $R^{35}$ to $R^{38}$ each represent a C$_2$H$_5$ group.

Among the compounds, the oligothiophene-based compound is preferable from the viewpoint of a low threshold value of responding light intensity.

In addition, a conjugated liquid crystal compound can be used as the photo-responsive substance. A rod-like liquid crystal compound is preferable as liquid crystal compound which can function as such a photo-responsive substance.

It is preferable that an anisotropic substance be further contained in the photo-alignment material in a case of being applied to an alignment film of a liquid crystal display element, or the like.

A liquid crystal is used as the anisotropic substance.

It is preferable that a compound denoted by General Formula (LC) shown below be contained as the liquid crystal.

(LC)

(In General Formula (LC), $R^{LC}$ represents an alkyl group having 1 to 15 carbon atoms, one or more CH$_2$ groups of the alkyl group may be substituted with —O—, —CH=CH—, —CO—, —OCO—, —COO—, or C≡C— in the manner that oxygen atoms are not directly adjacent to each other, and one or more hydrogen atoms of the alkyl group may be arbitrarily substituted with a halogen atom, $A^{LC1}$ and $A^{LC2}$ each independently represent one selected from the group consisting of:

(a) a trans-1,4-cyclohexylene group (in this group, one CH$_2$ group or two or more CH$_2$ groups which are not adjacent to each other may be substituted with an oxygen atom or a sulfur atom), (b) a 1,4-phenylene group (in this group, one CH group or two or more CH groups which are not adjacent to each other may be substituted with a nitrogen atom), and (c) a 1,4-bicyclo(2.2.2) octylene group, a naphthalene-2,6-diyl group, a decahydronaphthalene-2,6-diyl group, a 1,2,3,4-tetrahydronaphthalene-2,6-diyl group, or a chroman-2,6-diyl group, one or more hydrogen atoms included in the group (a), the group (b), or the group (c) described above may be respectively substituted with F, Cl, CF$_3$, or OCF$_3$;

$Z^{LC}$ represents a single bond, —CH=CH—, —CF=CF—, —C≡C—, —CH$_2$CH$_2$—, —(CH$_2$)$_4$—, —OCH$_2$—, —CH$_2$O—, —OCF$_2$—, —CF$_2$O—, —COO—, or OCO—;

$Y^{LC}$ represents a hydrogen atom, a fluorine atom, a chlorine atom, a cyano group, and an alkyl group having 1 to 15 carbon atoms, one or more CH$_2$ groups of the alkyl group may be substituted with —O—, —CH=CH—, —CO—, —OCO—, —COO—, —C≡C—, —CF$_2$O—, and —OCF$_2$— in the manner that oxygen atoms are not directly adjacent to each other, one or more hydrogen atoms of the alkyl group may be arbitrarily substituted with a halogen atom;

a represents an integer of 1 to 4, when a represents 2, 3, or 4;

when a plurality of $A^{LC1}$s exist, the plurality of $A^{LC1}$s may be identical to each other or different from each other, and when a plurality of $Z^{LC}$s exist, the plurality of $Z^{LC}$s may be identical to each other or different from each other.)

It is preferable that the compound denoted by General Formula (LC) described above be one or more compounds selected from a compound group denoted by General Formula (LC1) and General Formula (LC2) shown below.

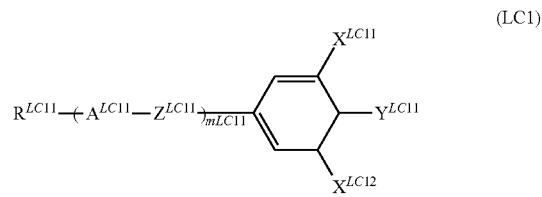
(LC1)

(LC2)

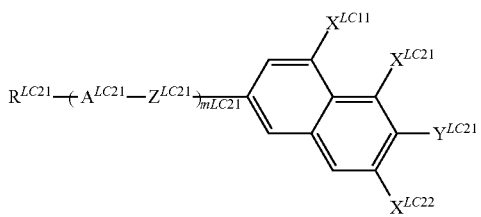

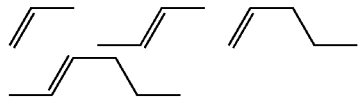

(In the formula, a bond with respect to a ring structure is formed on a right end.)

It is preferable that $A^{LC11}$ and $A^{LC21}$ each independently have the following structure.

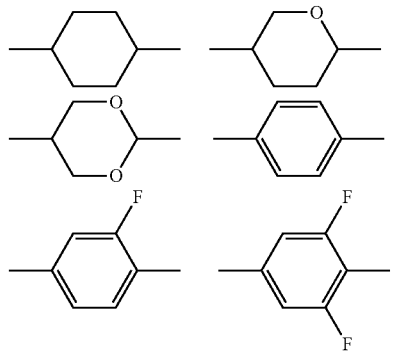

(In the formula, $R^{LC11}$ and $R^{LC21}$ each independently represent an alkyl group having 1 to 15 carbon atoms, one or more CH$_2$ groups of the alkyl group may be substituted with —O—, —CH═CH—, —CO—, —OCO—, —COO—, or C≡C— in the manner that oxygen atoms are not directly adjacent to each other, one or more hydrogen atoms of the alkyl group may be arbitrarily substituted with a halogen atom;

$A^{LC11}$ and $A^{LC21}$ each independently represent any one of the following structures,

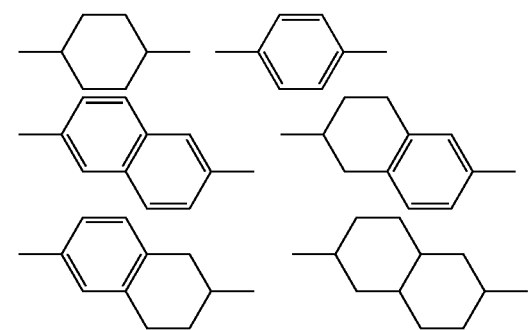

(in the structures, one or more CH$_2$ groups of a cyclohexylene group may be substituted with an oxygen atom, one or more CH groups of a 1,4-phenylene group may be substituted with a nitrogen atom, and one or more hydrogen atoms of the structure may be substituted with F, Cl, CF$_3$, or OCF$_3$);

$X^{LC11}$, $X^{LC12}$, and $X^{LC21}$ to $X^{LC23}$ each independently represent a hydrogen atom, Cl, F, CF$_3$, or OCF$_3$;

$Y^{LC11}$ and $Y^{LC21}$ each independently represent a hydrogen atom, Cl, F, CN, CF$_3$, OCH$_2$F, OCHF$_2$, or OCF$_3$;

$Z^{LC11}$ and $Z^{LC21}$ each independently represent a single bond, —CH═CH—, —CF═CF—, —C≡C—, —CH$_2$CH$_2$—, —(CH$_2$)$_4$—, —OCH$_2$—, —CH$_2$O—, —OCF$_2$—, —CF$_2$O—, —COO—, or OCO—;

$m^{LC11}$ and $m^{LC21}$ each independently represent an integer of 1 to 4; and when a plurality of $A^{LC11}$s, $A^{LC21}$s, $Z^{LC11}$s, and $Z^{LC21}$s exist, the plurality of $A^{LC11}$s, $A^{LC21}$s, $Z^{LC11}$s, and $Z^{LC21}$s may be identical to each other or different from each other.)

$R^{LC11}$ and $R^{LC21}$ each independently preferably represent an alkyl group having 1 to 7 carbon atoms, an alkoxy group having 1 to 7 carbon atoms, and an alkenyl group having 2 to 7 carbon atoms, and more preferably represent an alkyl group having 1 to 5 carbon atoms, an alkoxy group having 1 to 5 carbon atoms, and an alkenyl group having 2 to 5 carbon atoms, and even more preferably represent a straight-chained group, and an alkenyl group having the following structure is most preferable.

$Y^{LC11}$ and $Y^{LC21}$ each independently preferably represent F, CN, CF$_3$, or OCF$_3$, preferably represent F or OCF$_3$, and particularly preferably represent F.

$Z^{LC11}$ and $Z^{LC21}$ preferably represent a single bond, —CH$_2$CH$_2$—, —COO—, —OCO—, —OCH$_2$—, —CH$_2$O—, —OCF$_2$—, or CF$_2$O—, preferably represent a single bond, —CH$_2$CH$_2$—, —OCH$_2$—, —OCF$_2$—, or CF$_2$O—, and more preferably represent a single bond, —OCH$_2$—, or CF$_2$O—.

It is preferable that $m^{LC11}$ and $m^{LC21}$ represent 1, 2, or 3, it is preferable that $m^{LC11}$ and $m^{LC21}$ represent 1 or 2 in a case of emphasizing preservation stability and response speed at a low temperature, and it is preferable that $m^{LC11}$ and $m^{LC21}$ represent 2 or 3 in order to improve the upper limit value of a nematic phase upper limit temperature.

It is preferable that the compound denoted by General Formula (LC1) described above be one or more compounds selected from the group consisting of compounds denoted by General Formula (LC1-a) to General Formula (LC1-c) shown below.

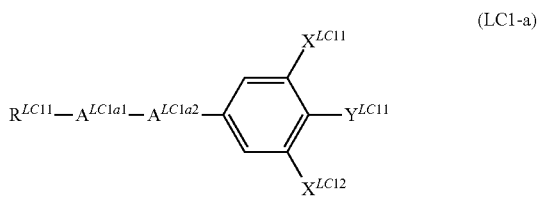

(LC1-a)

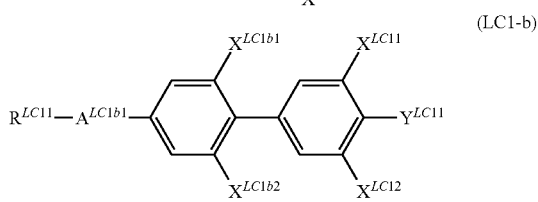

(LC1-b)

(LC1-c)

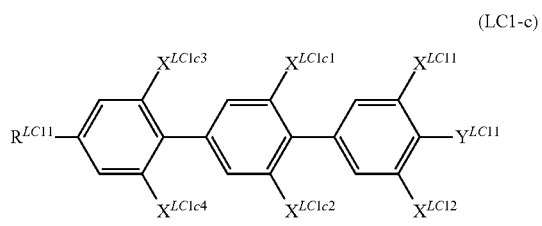

(LC1-g)

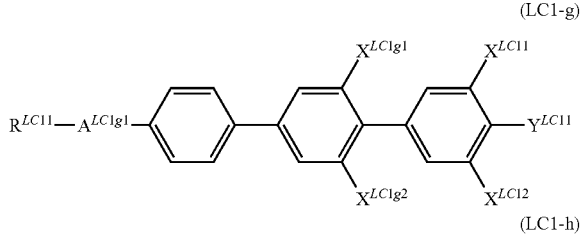

(In the formula, $R^{LC11}$, $Y^{LC11}$, $X^{LC11}$, and $X^{LC12}$ are each independently identical to $R^{LC11}$, $Y^{LC11}$, $X^{LC11}$, and $X^{LC12}$ of General Formula (LC1) described above, $A^{LC1a1}$, $A^{LC1a2}$, and $A^{LC1b1}$ represent a trans-1,4-cyclohexylene group, a tetrahydropyran-2,5-diyl group, and a 1,3-dioxane-2,5-diyl group, and $X^{LC1b1}$, $X^{LC1b2}$, and $X^{LC1c1}$ to $X^{LC1c4}$ each independently represent a hydrogen atom, Cl, F, $CF_3$, or $OCF_3$.)

$R^{LC11}$s each independently preferably represent an alkyl group having 1 to 7 carbon atoms, an alkoxy group having 1 to 7 carbon atoms, and an alkenyl group having 2 to 7 carbon atoms, and more preferably represent an alkyl group having 1 to 5 carbon atoms, an alkoxy group having 1 to 5 carbon atoms, and an alkenyl group having 2 to 5 carbon atoms.

It is preferable that $X^{LC11}$ to $X^{LC1c4}$ each independently represent a hydrogen atom or F.

It is preferable that $Y^{LC11}$s each independently represent F, $CF_3$, or $OCF_3$.

In addition, it is preferable that the compound denoted by General Formula (LC1) described above be one or more compounds selected from the group consisting of compounds denoted by General Formula (LC1-d) to General Formula (LC1-m) shown below.

(LC1-h)

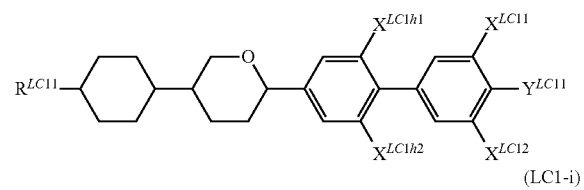

(LC1-i)

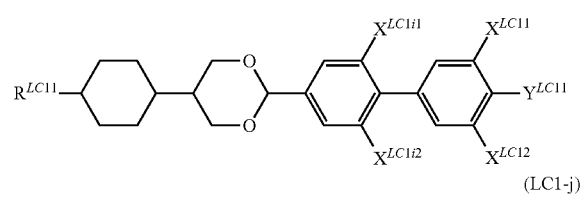

(LC1-j)

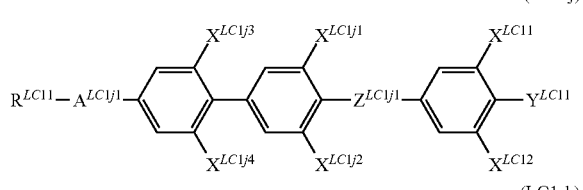

(LC1-k)

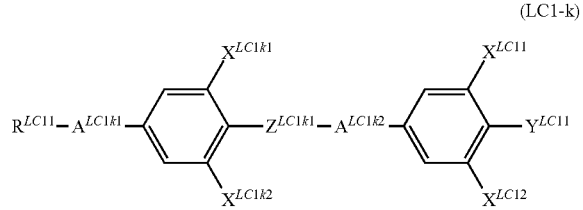

(LC1-d)

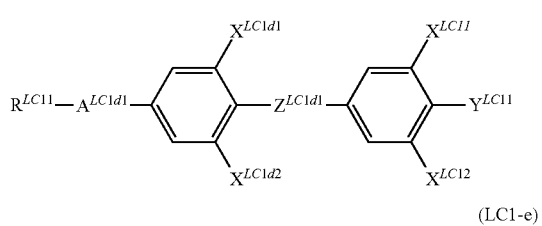

(LC1-e)

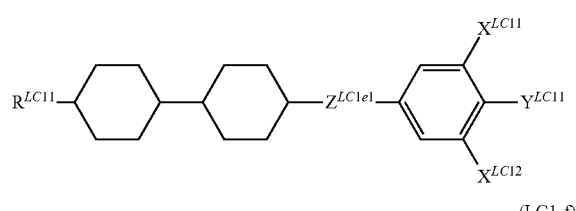

(LC1-f)

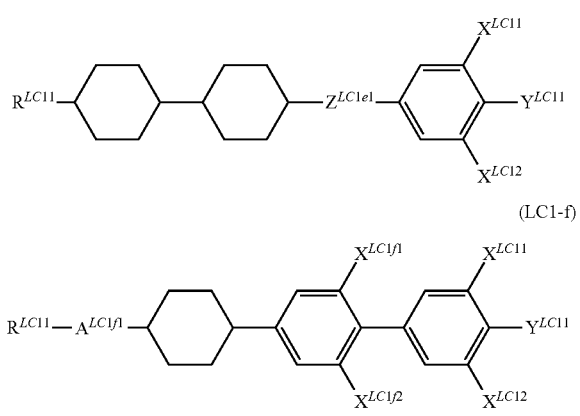

(LC1-m)

(In the formula, $R^{LC11}$, $Y^{LC11}$, $X^{LC11}$, and $X^{LC12}$ are each independently identical to $R^{LC11}$, $Y^{LC11}$, $X^{LC11}$, and $X^{LC12}$ of General formula (LC1) described above.

$A^{LC1d1}$, $A^{LC1f1}$, $A^{LC1g1}$, $A^{LC1j1}$, $A^{LC1k1}$, $A^{LC1k2}$, and $A^{LC1m1}$ to $A^{LC1m3}$ represent a 1,4-phenylene group, a trans-1,4-cyclohexylene group, a tetrahydropyran-2,5-diyl group, and a 1,3-dioxane,2,5-diyl group;

$X^{LC1d1}$, $X^{LC1d2}$, $X^{LC1f1}$, $X^{LC1f2}$, $X^{LC1g1}$, $X^{LC1g2}$, $X^{LC1h1}$, $X^{LC1h2}$, $X^{LC1i1}$, $X^{LC1i2}$, $X^{LC1j1}$ to $X^{LC1j4}$, $X^{LC1k1}$, $X^{LC1k2}$, $X^{LC1m1}$, and $X^{LC1m2}$ each independently represent a hydrogen atom, Cl, F, $CF_3$, or $OCF_3$, and $Z^{LC1d1}$, $Z^{LC1e1}$, $Z^{LC1j1}$, $Z^{LC1k1}$, and $Z^{LC1m1}$ each independently represent a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or OCO—.)

$R^{LC11}$s each independently preferably represent an alkyl group having 1 to 7 carbon atoms, an alkoxy group having 1 to 7 carbon atoms, and an alkenyl group having 2 to 7 carbon atoms, and more preferably represent an alkyl group having 1 to 5 carbon atoms, an alkoxy group having 1 to 5 carbon atoms, and an alkenyl group having 2 to 5 carbon atoms.

It is preferable that $X^{LC11}$ to $X^{LC1m2}$ each independently represent a hydrogen atom or F. It is preferable that $Y^{LC11}$s each independently represent F, $CF_3$, or $OCF_3$.

It is preferable that $Z^{LC1d1}$ to $Z^{LC1m1}$ each independently represent —$CF_2O$— and —$OCH_2$—.

It is preferable that the compound denoted by General Formula (LC2) described above be one or more compounds selected from the group consisting of compounds denoted by General Formula (LC2-a) to General Formula (LC2-g) shown below.

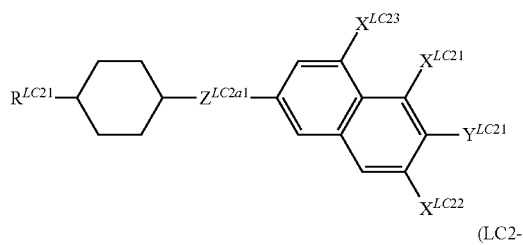
(LC2-a)

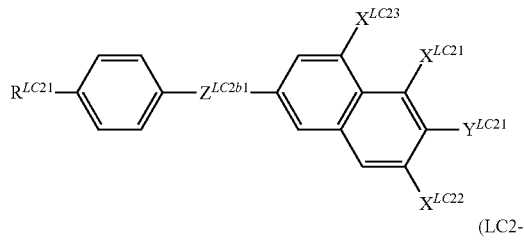
(LC2-b)

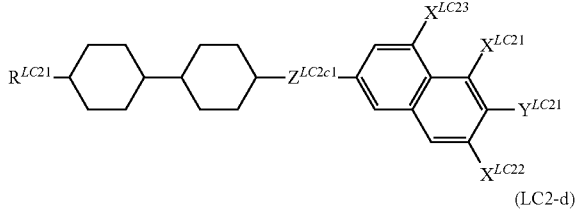
(LC2-c)

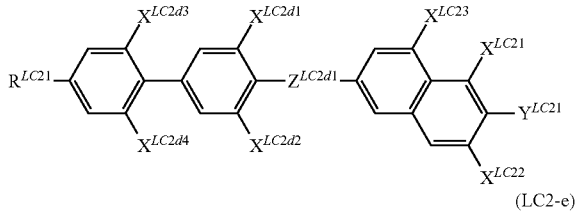
(LC2-d)

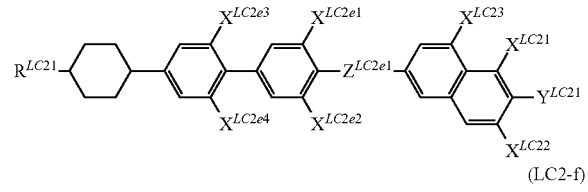
(LC2-e)

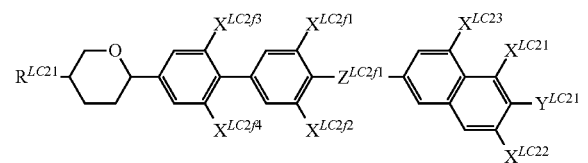
(LC2-f)

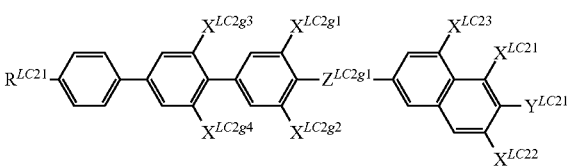
(LC2-g)

(In the formula, $R^{LC21}$, $Y^{LC21}$, and $X^{LC21}$ to $X^{LC23}$ are each independently identical to $R^{LC21}$, $Y^{LC21}$, and $X^{LC21}$ to $X^{LC23}$ of General Formula (LC2) described above;

$X^{LC2d1}$ to $X^{LC2d4}$, $X^{LC2e1}$ to $X^{LC2e4}$, $X^{LC2f1}$ to $X^{LC2f4}$, and $X^{LC2g1}$ to $X^{LC2g4}$ each independently represent a hydrogen atom, Cl, F, $CF_3$, or $OCF_3$, and $Z^{LC2a1}$, $Z^{LC2b1}$, $Z^{LC2c1}$, $Z^{LC2d1}$, $Z^{LC2e1}$, $Z^{LC2f1}$, and $Z^{LC2g1}$ each independently represent a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or OCO—.)

$R^{LC21}$s each independently preferably represent an alkyl group having 1 to 7 carbon atoms, an alkoxy group having 1 to 7 carbon atoms, and an alkenyl group having 2 to 7 carbon atoms, and more preferably represent an alkyl group having 1 to 5 carbon atoms, an alkoxy group having 1 to 5 carbon atoms, and an alkenyl group having 2 to 5 carbon atoms.

It is preferable that $X^{LC21}$ to $X^{LC2g4}$ each independently represent a hydrogen atom or F, and it is preferable that $Y^{LC21}$s each independently represent F, $CF_3$, or $OCF_3$.

It is preferable that $Z^{LC2a1}$ to $Z^{LC2g4}$ each independently represent —$CF_2O$— and —$OCH_2$—.

In addition, it is preferable that the compound denoted by General Formula (LC) described above be one or more compounds selected from a compound group denoted by General Formula (LC3) to General Formula (LC5) shown below.

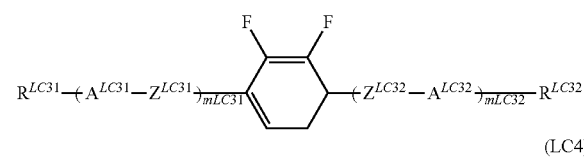
(LC3)

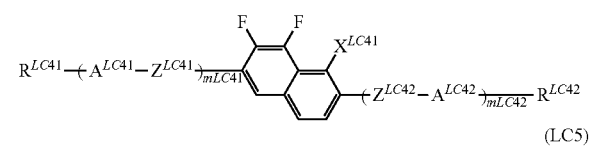
(LC4)

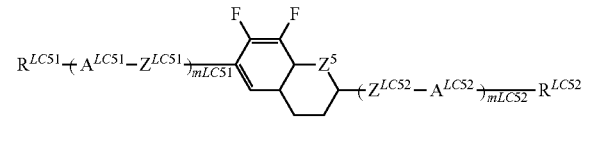
(LC5)

(In the formula, $R^{LC31}$, $R^{LC32}$, $R^{LC41}$, $R^{LC42}$, $R^{LC51}$, and $R^{LC52}$ each independently represent an alkyl group having 1 to 15 carbon atoms, one or more $CH_2$ groups of the alkyl group may be substituted with —O—, —CH=CH—, —CO—, —OCO—, —COO—, or C≡C— in the manner that oxygen atoms are not directly adjacent to each other, one or more hydrogen atoms of the alkyl group may be arbitrarily substituted with a halogen atom;

$A^{LC31}$, $A^{LC32}$, $A^{LC41}$, $A^{LC42}$, $A^{LC51}$, and $A^{LC52}$ each independently represent any one of the following structures,

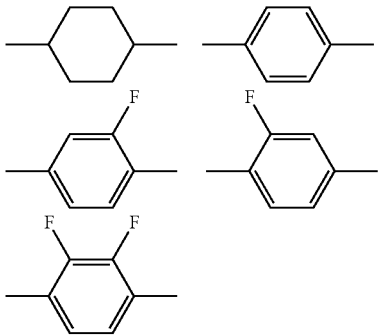

(in the structures, one or more $CH_2$ groups of a cyclohexylene group may be substituted with an oxygen atom, one or more CH groups of a 1,4-phenylene group may be substituted with a nitrogen atom, and one or more hydrogen atoms in the structure may be substituted with Cl, $CF_3$, or $OCF_3$);

$Z^{LC31}$, $Z^{LC32}$, $Z^{LC41}$, $Z^{LC42}$, $Z^{LC51}$, and $Z^{LC51}$ each independently represent a single bond, —CH=CH—, —C≡C—, —$CH_2CH_2$—, —$(CH_2)_4$—, —COO—, —$OCH_2$—, —$CH_2O$—, —$OCF_2$—, or $CF_2O$—;

$Z^5$ represents a $CH_2$ group or an oxygen atom;

$X^{LC41}$ represents a hydrogen atom or a fluorine atom,

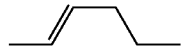

(In the formula, a bond with respect to a ring structure is formed on a right end.)

it is preferable that $A^{LC31}$ to $A^{LC52}$ each independently represent the following structure, and

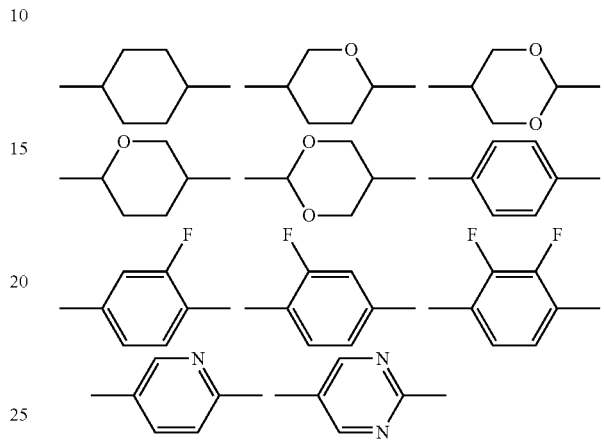

it is preferable that $Z^{LC31}$ to $Z^{LC51}$ each independently represent a single bond, —$CH_2O$—, —COO—, —OCO—, —$CH_2CH_2$—, —$CF_2O$—, —$OCF_2$—, or $OCH_2$—.

It is preferable that the compound denoted by General Formula (LC3) described above be one or more compounds selected from a compound group denoted by General Formula (LC3-a) and General Formula (LC3-b) shown below.

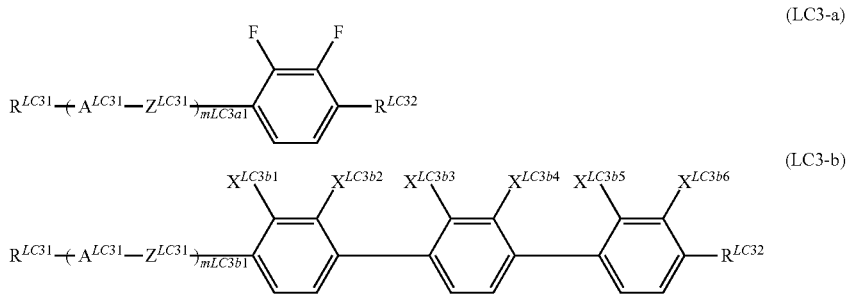

$m^{LC31}$, $m^{LC32}$, $m^{LC41}$, $m^{LC42}$, $m^{LC51}$, and $m^{LC52}$ each independently represent 0 to 3, $m^{LC31}+m^{LC32}$, $m^{LC41}+m^{LC42}$ and $m^{LC51}+m^{LC52}$ represent 1, 2, or 3; and when a plurality of $A^{LC31}$s to $A^{LC52}$S, and $Z^{LC31}$s to $Z^{LC52}$S exist, the plurality of $A^{LC31}$s to $A^{LC52}$s, and $Z^{LC31}$s to $Z^{LC52}$s may be identical to each other or different from each other.)

It is preferable that $R^{LC31}$ to $R^{LC52}$ each independently represent an alkyl group having 1 to 7 carbon atoms, an alkoxy group having 1 to 7 carbon atoms, and an alkenyl group having 2 to 7 carbon atoms, and an alkenyl group having the following structure is most preferable,

(In the formula, $R^{LC31}$, $R^{LC32}$, $A^{LC31}$, and $Z^{LC31}$ are each independently identical to $R^{LC31}$, $R^{LC32}$, $A^{LC31}$, and $Z^{LC31}$ of above General Formula (LC3) described above;

$X^{LC3b1}$ to $X^{LC3b6}$ represent a hydrogen atom or a flourine atom, a combination of at least one of $X^{LC3b1}$ and $X^{LC3b2}$ or $X^{LC3b3}$ and $X^{LC3b4}$ represents a flourine atom;

$m^{LC3a1}$ represents 1, 2, or 3;

$m^{LC3b1}$ represents 0 or 1, and when a plurality of $A^{LC31}$s and $Z^{LC31}$s exist, the plurality of $A^{LC31}$s and $Z^{LC31}$s may be identical to each other or different from each other.)

It is preferable that $R^{LC31}$ and $R^{LC32}$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.

$A^{LC31}$ preferably represents a 1,4-phenylene group, a trans-1,4-cyclohexylene group, a tetrahydropyran-2,5-diyl group, and a 1,3-dioxane-2,5-diyl group, and more preferably represents a 1,4-phenylene group and a trans-1,4-cyclohexylene group.

$Z^{LC31}$ preferably represents a single bond, —CH$_2$O—, —COO—, —OCO—, and —CH$_2$CH$_2$—, and more preferably represents a single bond.

It is preferable that General Formula (LC3-a) described above represent General Formula (LC3-a1) to General Formula (LC3-a4) shown below.

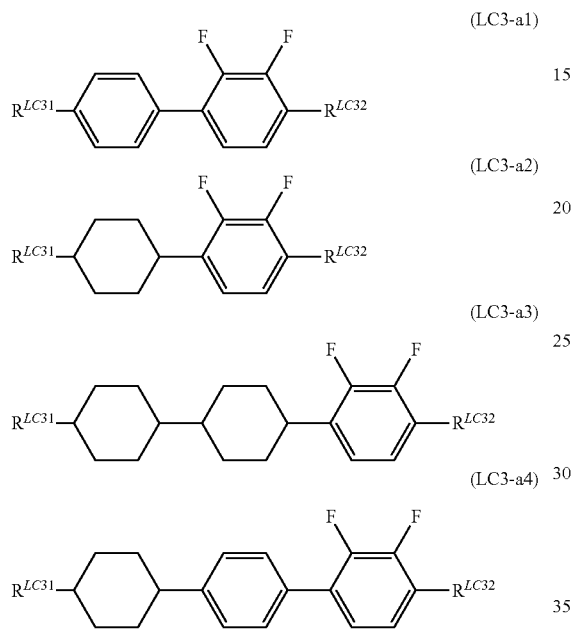

(In the formula, $R^{LC31}$ and $R^{LC32}$ are each independently identical to $R^{LC31}$ and $R^{LC32}$ of General Formula (LC3) described above.)

It is preferable that $R^{LC31}$ and $R^{LC32}$ each independently represent an alkyl group having 1 to 7 carbon atoms, an alkoxy group having 1 to 7 carbon atoms, and an alkenyl group having 2 to 7 carbon atoms, and it is more preferable that $R^{LC31}$ represent an alkyl group having 1 to 7 carbon atoms, and $R^{LC32}$ represent an alkoxy group having 1 to 7 carbon atoms.

General Formula (LC3-b) described above preferably represents General Formula (LC3-b1) to General Formula (LC3-b12) shown below, more preferably represents General Formula (LC3-b1), General Formula (LC3-b6), General Formula (LC3-b8), and General Formula (LC3-b11) shown below, even more preferably represents General Formula (LC3-b1) and General Formula (LC3-b6) shown below, and most preferably represents General Formula (LC3-b1) shown below.

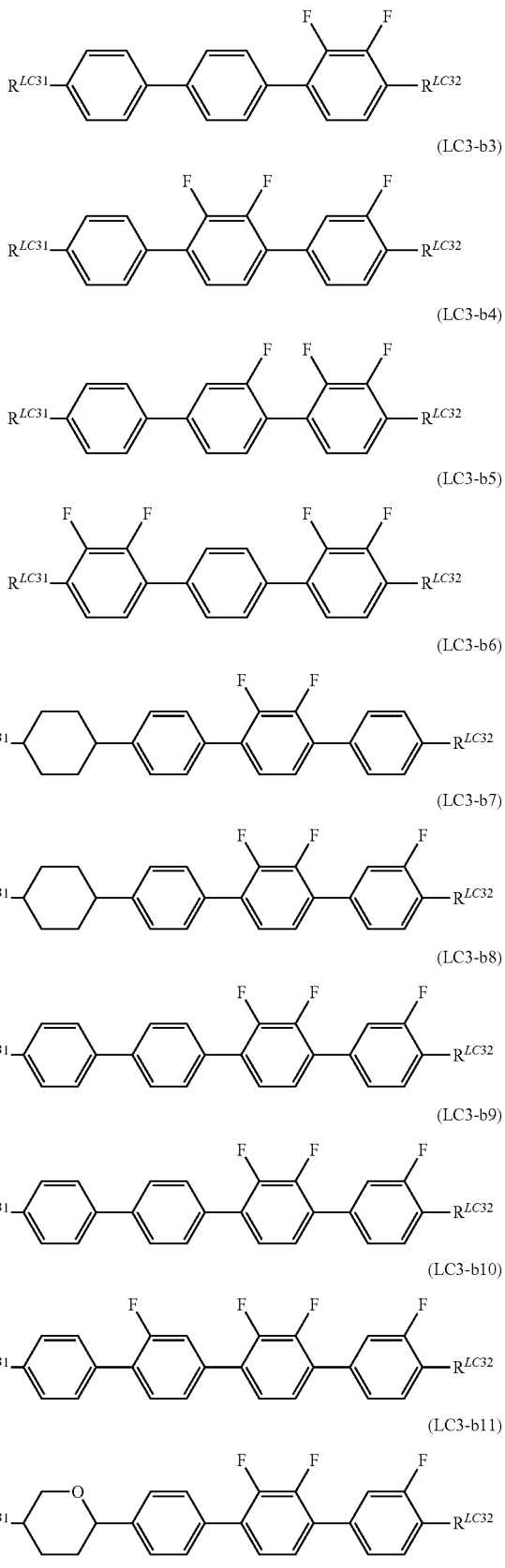

-continued (LC3-b12)

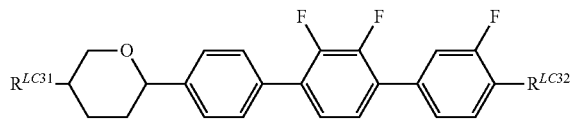

(In the formula, $R^{LC31}$ and $R^{LC32}$ are each independently identical to $R^{LC31}$ and $R^{LC32}$ of General Formula (LC3) described above.)

It is preferable that $R^{LC31}$ and $R^{LC32}$ each independently represent an alkyl group having 1 to 7 carbon atoms, an alkoxy group having 1 to 7 carbon atoms, and an alkenyl group having 2 to 7 carbon atoms, and it is more preferable that $R^{LC31}$ represent an alkyl group having 2 or 3 carbon atoms, and $R^{LC32}$ represent an alkyl group having 2 carbon atoms.

It is more preferable that General Formula (LC4) described above be one or more compounds selected from the group consisting of compounds denoted by General Formula (LC4-a) to General Formula (LC4-c) shown below, and General Formula (LC5) described above be one or more compounds selected from the group consisting of compounds denoted by General Formula (LC5-a) to General Formula (LC5-c) shown below.

(LC4-a)

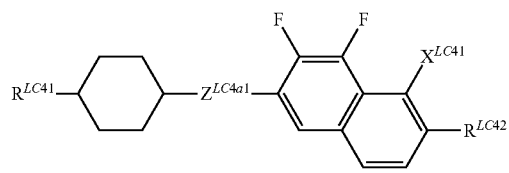

(LC4-b)

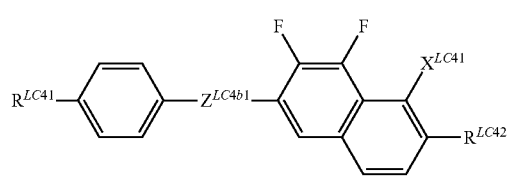

(LC4-c)

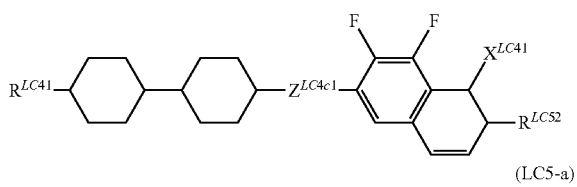

(LC5-a)

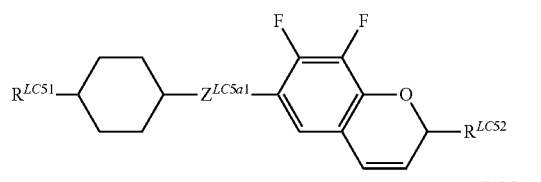

(LC5-b)

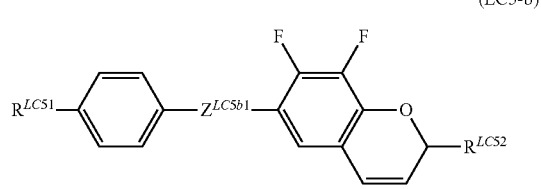

-continued (LC5-c)

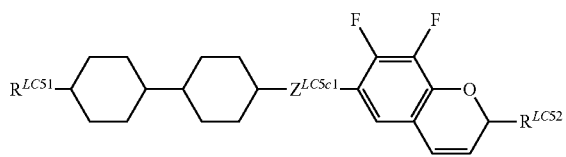

(In the formula, $R^{LC41}$, $R^{LC42}$, and $X^{LC41}$ are each independently identical to $R^{LC41}$, $R^{LC42}$, and $X^{LC41}$ of General Formula (LC4) described above, $R^{LC51}$ and $R^{LC52}$ are each independently identical to $R^{LC51}$ and $R^{LC52}$ of General Formula (LC5) described above, and $Z^{LC4a1}$, $Z^{LC4b1}$, $Z^{LC4c1}$, $Z^{LC5a1}$, $Z^{LC5b1}$, and $Z^{LC5c1}$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or CF$_2$O—.)

It is preferable that $R^{LC41}$, $R^{LC42}$, $R^{LC51}$ and $R^{LC52}$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.

$Z^{LC4a1}$ to $Z^{LC5c1}$ each independently preferably represent a single bond, —CH$_2$O—, —COO—, —OCO—, and —CH$_2$CH$_2$—, and more preferably represent a single bond.

It is preferable that the compound denoted by General Formula (LC) described above be a liquid crystal composition containing one or more compounds denoted by General Formula (LC6) shown below.

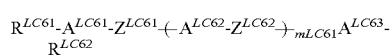

(LC6)

(In the formula, $R^{LC61}$ and $R^{LC62}$ each independently represent an alkyl group having 1 to 15 carbon atoms, one or more CH$_2$ groups of the alkyl group may be substituted with —O—, —CH=CH—, —CO—, —OCO—, —COO—, or C≡C— in the manner that oxygen atoms are not directly adjacent to each other, one or more hydrogen atoms of the alkyl group may be arbitrarily substituted with a halogen, and $A^{LC61}$ to $A^{LC63}$ each independently represent any one of the following,

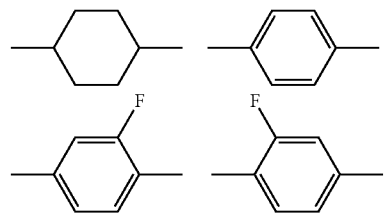

(in the structure, one or more CH$_2$CH$_2$ groups of a cyclohexylene group may be substituted with —CH=CH—, —CF$_2$O—, and —OCF$_2$—, and one or more CH groups of a 1,4-phenylene group may be substituted with a nitrogen atom);

$Z^{LC61}$ and $Z^{LC62}$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or CF$_2$O—; and $m^{iii1}$ represents 0 to 3. Here, compounds denoted by General Formula (LC1) to General Formula (LC5) described above are excluded.)

It is preferable that $R^{LC61}$ and $R^{LC62}$ each independently represent an alkyl group having 1 to 7 carbon atoms, an alkoxy group having 1 to 7 carbon atoms, and an alkenyl group having 2 to 7 carbon atoms, it is most preferable that the alkenyl group be an alkenyl group having the following structure,

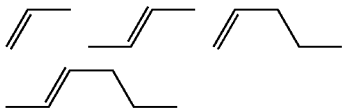

(In the formula, a bond with respect to a ring structure is formed on a right end.)

it is preferable that $A^{LC61}$ to $A^{LC63}$ each independently have the following structure, and

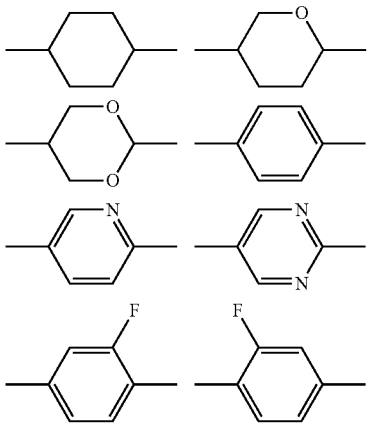

it is preferable that $Z^{LC61}$ and $Z^{LC62}$ each independently represent a single bond, —CH$_2$CH$_2$—, —COO—, —OCH$_2$—, —CH$_2$O—, —OCF$_2$—, or CF$_2$O—.

It is more preferable that General Formula (LC6) described above be one or more compounds selected from the group consisting of compounds denoted by General Formula (LC6-a) to General Formula (LC6-m) shown below.

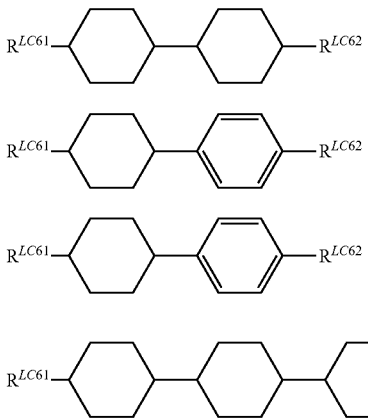

(LC6-a)
(LC6-b)
(LC6-c)
(LC6-d)

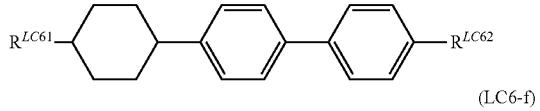

(LC6-e)

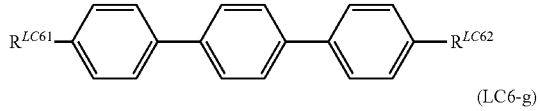

(LC6-f)

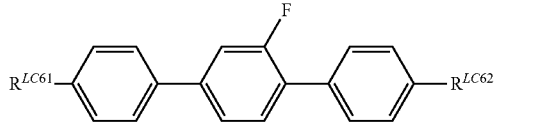

(LC6-g)

(LC6-h)

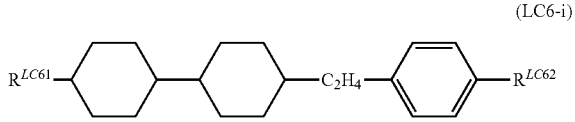

(LC6-i)

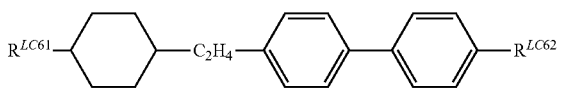

(LC6-j)

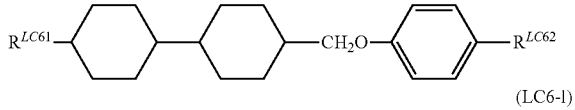

(LC6-k)

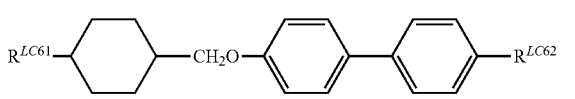

(LC6-l)

(LC6-m)

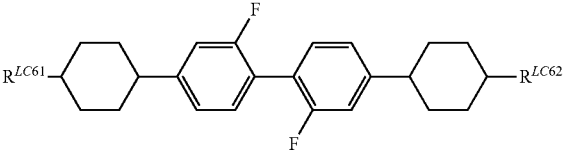

(In the formula, $R^{LC61}$ and $R^{LC62}$ each independently represent an alkyl group having 1 to 7 carbon atoms, an alkoxy group having 1 to 7 carbon atoms, an alkenyl group having 2 to 7 carbon atoms, or an alkenyloxy group having 2 to 7 carbon atoms.)

In addition, the liquid crystal may be any one of a rod-like liquid crystal (a nematic liquid crystal and a smectic liquid crystal), a disk-like (discotic) liquid crystal, a bending type liquid crystal (a banana liquid crystal), and a liquid crystal in which chirality is imparted to the liquid crystal described above.

The type of liquid crystal (a rod-like liquid crystal, a disk-like liquid crystal, or a bending type liquid crystal) is suitably selected in order to obtain desired refractive index anisotropy. When high responsibility is necessary, a nematic liquid crystal, which is a liquid crystal close to a liquid, is preferable, and when stable alignment properties are necessary, a smectic liquid crystal which is close to a solid is preferably used. It is possible to use a unique liquid crystal phase in a chiral liquid crystal, and in this case, a liquid crystal in which a part or all thereof is chiral may be used or a liquid crystal and a chiral non-liquid crystal may be mixed. In addition, any one of a monomer, a dimer, a multimer (an oligomer) of greater than or equal to a trimer, and a polymer may be used as the liquid crystal. When high responsibility is necessary, a monomer is preferable, and when stable alignment properties are necessary, a dimer, a multimer (an oligomer) of greater than or equal to a trimer, and a polymer are preferable.

When the anisotropic substance is contained in the photo-alignment material, a ratio of the photo-responsive substance in the photo-alignment material is preferably greater than or equal to 0.01 mol % and less than or equal to 30 mol %, and more preferably greater than or equal to 0.05 mol % and less than or equal to 10 mol %, in a molar ratio.

When the ratio of the photo-responsive substance in the photo-alignment material is in the range described above, the photo-alignment material is irradiated with light such that light intensity is greater than or equal to a threshold value, and thus, it is possible to easily align the anisotropic substance contained in the photo-alignment material in an arbitrary direction according to the alignment of the photo-responsive substance.

Furthermore, here, the arbitrary direction in which the photo-responsive substance and the anisotropic substance are aligned is a direction in which a long axis direction of the substance (molecules) is parallel to a vibration direction of the light.

In order to reduce the threshold value of the light intensity, the photo-alignment material can contain an oligomer and/or a polymer.

In this case, the oligomer and/or the polymer may be mixed in a photo-alignment material, or a low-molecular-weight compound having a polymerizable group may be mixed and then may be polymerized.

In particular, examples of the oligomer and/or the polymer include polyacrylate, polymethacrylate, polyacrylamide, polymethacrylamide, polymethyl methacrylate, and the like. A degree of polymerization or the presence or absence of liquid crystallinity may be determined in consideration of solubility with respect to the photo-alignment material.

The low-molecular-weight compound having a polymerizable group may have liquid crystallinity or may not have liquid crystallinity, and it is preferable that the low-molecular-weight compound having a polymerizable group have liquid crystallinity. Furthermore, having liquid crystallinity indicates including a rigid portion referred to as mesogen and having alignment properties. Examples of the polymerizable compound having liquid crystallinity include a rod-like polymerizable liquid crystal compound having a rigid portion referred to as mesogen in which a plurality of structures are connected, such as a 1,4-phenylene group and 1,4-cyclohexylene group and a (meth)acryloyl oxy group, and a polymerizable functional group such as a vinyl oxy group and an epoxy group, as disclosed in Japanese Unexamined Patent Application, First Publication No. H7-294735, Japanese Unexamined Patent Application, First Publication No. H8-3111, Japanese Unexamined Patent Application, First Publication No. H8-29618, Japanese Unexamined Patent Application, First Publication No. H11-80090, Japanese Unexamined Patent Application, First Publication No. H11-148079, Japanese Unexamined Patent Application, First Publication No. 2000-178233, Japanese Unexamined Patent Application, First Publication No. 2002-308831, and Japanese Unexamined Patent Application, First Publication No. 2002-145830, or Handbook of Liquid Crystals (edited by D. Demus, J. W. Goodby, G. W. Gray, H. W. Spiess, V. Vill, published by Wiley-VCH Verlag GmbH & Co., 1998), Kikan Kagaku Sosetsu No. 22, Liquid Crystal Chemistry (The Chemical Society of Japan, 1994), a rod-like polymerizable liquid crystal compound having a maleimide group as disclosed in Japanese Unexamined Patent Application, First Publication No. 2004-2373 and Japanese Unexamined Patent Application, First Publication No. 2004-99446, a rod-like polymerizable liquid crystal compound having an allyl ether group as disclosed in Japanese Unexamined Patent Application, First Publication No. 2004-149522, or a discotic polymerizable compound disclosed in, for example, Handbook of Liquid Crystals (edited by D. Demus, J. W. Goodby, G. W. Gray, H. W. Spiess, V. Vill, published by Wiley-VCH Verlag GmbH & Co., 1998), Kikan Kagaku Sosetsu No. 22, Liquid Crystal Chemistry (The Chemical Society of Japan, 1994), or Japanese Unexamined Patent Application, First Publication No. H07-146409.

The total content of the oligomer and/or the polymer in the photo-alignment material is preferably greater than or equal to 0.1 mol % and less than or equal to 15 mol %, more preferably greater than or equal to 2 mol % and less than or equal to 13 mol %, and even more preferably greater than or equal to 5 mol % and less than or equal to 11 mol %.

When the content of the oligomer and/or the polymer in the photo-alignment material is in the range described above, it is possible to reduce the threshold value of the light intensity.

When the oligomer is added to the photo-alignment material, and even a polymerization initiator does not exist, polymerization progresses, and the polymerization initiator may be contained in order to accelerate polymerization. Examples of the polymerization initiator include benzoin ethers, benzophenones, acetophenones, benzyl ketals, acyl phosphine oxides, and the like.

When the photo-alignment material of the present invention is irradiated with light, the photo-responsive substance contained in the photo-alignment material is aligned such that the long axis direction thereof is parallel to the vibration direction of the light. For this reason, for example, alignment of anisotropic molecules is controlled by the light, and thus, a refractive index of the photo-alignment material can be spatially and regionally modulated or distributed. Accordingly, the photo-alignment material is used as an optical anisotropic material of an optical element exhibiting an optical function. Specifically, the photo-alignment material is applied to a display element controlling a transmitted light quantity of the light by using birefringence of the anisotropic substance (the liquid crystal), such as a liquid crystal display element or electronic paper, a lens, a retardation film, a hologram, an alignment film, a 3D printer, a prism, a mirror, a filter, and the like. When the anisotropic substance is contained in the photo-alignment material, when the photo-alignment material is irradiated with the light, and the photo-responsive substance is aligned, according to this, the anisotropic substance is also aligned such that the long axis direction thereof is parallel to the vibration direction of the light.

When the photo-alignment material of the present invention is applied to the alignment film, for example, the photo-alignment material is applied to an alignment film of a liquid crystal display element.

When the photo-alignment material of the present invention is applied to the liquid crystal display element, an alignment film formed of the alignment material of the present invention is formed on a substrate of the liquid crystal display element.

The liquid crystal display element is useful to an active matrix liquid crystal display (AM-LCD) element, a twisted nematic (TN) liquid crystal display element, a super-twisted nematic liquid crystal display (STN-LCD) element, OCB-LCD, an in-plane switching liquid crystal display (IPS-LCD) element, and a liquid crystal display element in a fringe-field switching (FFS) mode, is particularly useful to AM-LCD including an active matrix address device, and can be used in a transmission type or reflection type liquid crystal display element.

According to the photo-alignment material of the present invention, the photo-alignment material containing the photo-responsive substance having a threshold value of responding light intensity is irradiated with light having light intensity of greater than or equal to the threshold value, and thus, the photo-responsive substance contained in the photo-alignment material is aligned. The photo-responsive substance is aligned to be parallel to the vibration direction of the light, and thus, it is possible to easily control a tilt angle of the alignment film.

[Photo-Alignment Method]

A photo-alignment method of the present invention is a method using the photo-alignment material of the present invention, and is a method in which the photo-alignment material containing the photo-responsive substance having a threshold value of responding light intensity is irradiated with light having light intensity of greater than or equal to the threshold value, and the photo-responsive substance contained in the photo-alignment material is aligned.

The same photo-responsive substances as those used in the photo-alignment material of the present invention are used as the photo-responsive substance.

In addition, the oligomer and/or the polymer can be further contained in the photo-alignment material, as with the photo-alignment material of the present invention.

In addition, the anisotropic substance can be further contained in the photo-alignment material, as with the photo-alignment material of the present invention.

Here, a photo-alignment method in a case of manufacturing the alignment film by using the photo-alignment material of the present invention will be exemplified.

Light irradiation is performed with respect to the photo-alignment material of the present invention, and thus, the photo-responsive substance, or the photo-responsive substance and the anisotropic substance can be aligned.

<Manufacturing Method of Alignment Film>

Examples of a manufacturing method of an alignment film include a method in which the photo-alignment material is dissolved in a solvent and is applied onto a substrate, a coating film is formed, and then, the coating film is irradiated with light, and the photo-responsive substance is aligned such that the long axis direction thereof is parallel to a vibration direction of polarized light. In addition, examples of a manufacturing method of an alignment film include a method in which when the photo-alignment material contains the anisotropic substance, the coating film is irradiated with light, and the photo-responsive substance is aligned such that the long axis direction thereof is parallel to the vibration direction of the light, and thus, the anisotropic substance is aligned such that the long axis direction thereof is parallel to the vibration direction of the light.

It is preferable that the solvent used for dissolving the photo-alignment material be a solvent which dissolves the photo-alignment material of the present invention and other components to be arbitrarily used and not react therewith, examples of the solvent include an organic solvent such as 1,1,2-trichloroethane, N-methyl pyrrolidone, butoxy ethanol, γ-butyrolactone, ethylene glycol, polyethylene glycol monomethyl ether, propylene glycol, 2-pyrrolidone, N,N-dimethyl formamide, phenoxy ethanol, tetrahydrofuran, dimethyl sulfoxide, methyl isobutyl ketone, and cyclohexanone, and two or more of organic solvents may be used in combination.

Examples of the material of the substrate forming the alignment film include glass, silicon, polyethylene terephthalate, polybutylene terephthalate, polyether sulfone, polycarbonate, triacetyl cellulose, and the like.

When the substrate is used for the liquid crystal display element, an electrode layer such as an ITO film formed of Cr, Al, and $In_2O_3$—$SnO_2$, and an NESA layer formed of $SnO_2$ may be disposed on the substrate, and the electrode layer is patterned by using a photoetching method or a method using a mask at the time of forming the electrode layer.

Further, a color filter layer or the like may be formed on the substrate.

Examples of a method of applying a solution containing the photo-alignment material onto the substrate include a method such as spin coating, die coating, gravure coating, flexo printing, and ink jet printing.

It is preferable that a solid content concentration of the solution at the time of being applied be 0.5 mass % to 10 mass %, and it is more preferable that the solid content concentration be selected from the range in consideration of a method of applying the solution onto the substrate, viscosity, volatility, and the like.

In addition, it is preferable that the coating surface be heated after being coated, and thus, the solvent is removed, and in drying conditions, a drying temperature be preferably 50° C. to 300° C., and more preferably 80° C. to 200° C., and a drying times be preferably 5 minutes to 200 minutes, and more preferably 10 minutes to 100 minutes.

The coating film formed by the method described above is subjected to linear polarized light irradiation from a normal direction of the coating film surface (a normal direction of the coating film containing the photo-alignment material), and non-polarized light irradiation or linear polarized light irradiation from an oblique direction with respect to a normal direction of the coating film surface (a normal direction of the coating film containing the photo-alignment material), and thus, the photo-responsive substance, or the photo-responsive substance and the anisotropic substance can be aligned. In addition, the linear polarized light irradiation from the normal direction of the coating film surface, and the non-polarized light irradiation or the linear polarized light irradiation from the oblique direction with respect to the normal direction of the coating film surface may be performed in combination. In order to apply a desired pretilt angle to the alignment film, the linear polarized light irradiation from the oblique direction with respect to the normal direction of the coating film surface is preferable.

The light to be irradiated to the photo-alignment material is irradiated from the oblique direction with respect to the normal direction of the coating film containing the photo-alignment material, and thus, for example, even when the photo-responsive substance is aligned such that the long axis direction thereof is perpendicular to the vibration direction of the light before light irradiation, the light can be irradiated from the oblique direction with respect to the long axis direction of the photo-responsive substance. Accordingly, the photo-responsive substance can be efficiently aligned such that the long axis direction thereof is parallel to the vibration direction of the light. Further, when the photo-alignment material is irradiated with the light, an angle with respect to a normal direction of a layer containing the photo-alignment material is preferably greater than or equal to 0 degrees and less than or equal to 15 degrees, and more preferably greater than or equal to 0 degrees and less than or equal to 10 degrees, and the photo-responsive substance can be more efficiently aligned such that the long axis direction thereof is parallel to the vibration direction of the light.

For example, an ultraviolet ray and a visible light ray including light having a wavelength of 150 nm to 800 nm can be used as the light to be irradiated to the coating film, and an ultraviolet ray of 270 nm to 450 nm is particularly preferable.

Examples of a light source include a xenon lamp, a high-pressure mercury lamp, a super-high-pressure mercury lamp, a metal halide lamp, and the like. Linear polarized light can be obtained by using a polarization filter or a polarization prism with respect to light from the light source. In addition, ultraviolet light and visible light obtained from the light source may limit an irradiation wavelength range by using an interference filter, a color filter, or the like.

In addition, examples of the manufacturing method of an alignment film can include a method in which the photo-alignment material containing any one of the low-molecular-weight compound having a polymerizable group, the oligomer, and the polymer is used, the photo-alignment material is dissolved in the solvent described above and is applied onto the substrate, the coating film is formed, and then, the coating film is heated or irradiated with light, each of the low-molecular-weight compounds having a polymerizable group and/or the oligomer are polymerized, and thus, alignment control is exhibited, and the alignment film is obtained. In addition, the alignment of the photo-responsive substance or the anisotropic substance and the exhibition of the alignment control due to the polymerization of the low-molecular-weight compound having a polymerizable group and/or the oligomer may be simultaneously performed by the light irradiation with respect to the photo-alignment material, or the alignment of the photo-responsive substance or the anisotropic substance and the exhibition of alignment control due to the polymerization of the low-molecular-weight compound having a polymerizable group and/or the oligomer may be separately performed by a method of using two or more types of light rays having different wavelengths in combination.

In addition, in all of the manufacturing methods of an alignment film, an alignment film is further manufactured on the substrate on which the alignment film is formed in advance, and thus, it is possible to impart control of an alignment direction and an alignment angle due to the photo-alignment material of the present invention to the substrate.

In addition, when the photo-alignment material of the present invention is used, the low-molecular-weight compound having a polymerizable group and/or the oligomer are subjected to thermal polymerization in the heating step described above, and it is possible to prepare a polymer on the substrate, and in this case, it is preferable that the polymerization initiator be contained in the photo-alignment material. Alternatively, the solvent is removed in the heating step described above, and then, non-polarized light is irradiated, and the low-molecular-weight compound having a polymerizable group and/or the oligomer are subjected to photopolymerization. Therefore, it is possible to prepare a polymer on the substrate, and it is possible to use the thermal polymerization and the photopolymerization in combination.

When the polymer is prepared on the substrate by the thermal polymerization, the heating temperature is not particularly limited insofar as the polymerization of the low-molecular-weight compound having a polymerizable group and/or the oligomer sufficiently progresses, and in general, the heating temperature is approximately 50° C. to 250° C., and more preferably approximately 70° C. to 200° C. In addition, the polymerization initiator may or may not be added to the photo-alignment material.

When the polymer is prepared on the substrate by the photopolymerization, it is preferable that an ultraviolet ray of non-polarized light be used in the light irradiation. In addition, it is preferable that the polymerization initiator not be contained in the photo-alignment material.

The film thickness of the alignment film formed by the manufacturing method described above is preferably approximately 10 nm to 250 nm, and more preferably approximately 10 nm to 100 nm.

In the present invention, the alignment indicates a direction when the anisotropic substance such as the photo-responsive substance contained in the photo-alignment material or the liquid crystal contained in the photo-alignment material is directed towards a predetermined direction, indicates a direction of a molecular long axis in a case of rod-like molecules, and indicates a normal direction with respect to a disk surface in a case of disk-like molecules.

In the present invention, the pretilt angle indicates an angle between the alignment direction of the liquid crystal molecules or the polymerizable liquid crystal molecules and the substrate surface.

In the present invention, an optical axis indicates a direction in which a refractive index is constant, birefringence does not occur even when light which is not polarized is incident, and a normal light ray and an abnormal light ray are coincident with each other or a shift between the normal light ray and the abnormal light ray is minimized, in the liquid crystal display element or the optical anisotropic body.

In the present invention, the polymerizable liquid crystal indicates a compound which exhibits a liquid crystal phase and has a polymerizable chemical structure.

In the present invention, homogeneous alignment indicates alignment in which a pretilt angle is greater than or equal to 0 degrees and less than or equal to 20 degrees.

In the present invention, homeotropic alignment indicates alignment in which a pretilt angle is greater than or equal to 70 degrees and less than or equal to 90 degrees. An angle of the optical axis with respect to the substrate surface and the pretilt angle may or may not be coincident with each other.

[Manufacturing Method of Liquid Crystal Display Element]

For example, it is possible to manufacture a liquid crystal cell in which a liquid crystal composition is interposed between a pair of substrates, and a liquid crystal display element using the liquid crystal cell by using the alignment film formed by the method described above, as follows.

A liquid crystal cell can be manufactured by preparing two substrates on which an alignment film is formed, and by arranging a liquid crystal that is arranged between the two substrates. In addition, the alignment film described above may be formed on only one substrate of the two substrates.

Examples of a manufacturing method of a liquid crystal cell include the following methods.

First, two substrates are arranged such that alignment films thereof face each other, a peripheral portion is bonded by using a sealing agent in a state where a predetermined gap (a cell gap) is maintained between the two substrates, injection and filling of a liquid crystal is performed with respect to the cell gap partitioned by the substrate surface and the sealing agent, and then, an injection hole is sealed. Therefore, it is possible to manufacture a liquid crystal cell.

In addition, the liquid crystal cell can also be manufactured by a method referred to as a One Drop Fill (ODF) method. As a sequence thereof, for example, an ultraviolet curable sealing agent is applied to a predetermined portion on a substrate on which an alignment film is formed, a liquid crystal is dripped onto the surface of the alignment film, another substrate is then bonded such that the alignment films face each other, and after that, the entire substrate is irradiated with ultraviolet light, and a sealing agent is cured. Therefore, it is possible to manufacture a liquid crystal cell.

Even when the liquid crystal cell is manufactured by any method, it is preferable that fluid alignment in a case of performing injection be removed by performing heating up to a temperature at which the used liquid crystal has an isotropic phase, and then, by gradually performing cooling to room temperature.

For example, an epoxy resin or the like can be used as the sealing agent.

In addition, in order to maintain the cell gap to be constant, it is possible to use beads such as silica gel, alumina, and an acrylic resin as a spacer before bonding the two substrates, and the spacer may be sprayed onto a coating film of the alignment film, or the two substrates may be bonded after mixing the spacer and the sealing agent.

A polarizing plate is bonded to the outer surface of the liquid crystal cell manufactured as described above, and thus, it is possible to obtain a liquid crystal display element.

Examples of the polarizing plate include a polarizing plate formed of an "H film" in which iodine is absorbed while stretching and aligning polyvinyl alcohol, a polarizing plate in which the H film is interposed between cellulose acetate protective films, or the like.

[Manufacturing Method of Optical Anisotropic Body]

For example, it is possible to manufacture an optical anisotropic body such as a retardation film, which is useful in an optical anisotropic film used for optical compensation of the liquid crystal display element, by using the alignment film formed by the method described above, as follows.

When a polymerizable liquid crystal composition is applied onto the alignment film, a known and common coating method such as bar coating, spin coating, roll coating, gravure coating, spray coating, die coating, cap coating, and a dipping method may be used.

At this time, in order to increase coating properties, a known and common organic solvent may be added to the polymerizable liquid crystal composition. In this case, the organic solvent is removed by performing natural drying, heat drying, decompression drying, decompression heat drying, and the like after the polymerizable liquid crystal composition is applied onto the alignment film.

In order to obtain the optical anisotropic body by using the alignment film, the polymerizable liquid crystal composition is applied onto the alignment film, and polymerization is performed in a state where the polymerizable liquid crystal composition is aligned. Examples of a method of polymerizing the polymerizable liquid crystal composition include a method of irradiating an active energy ray, a thermal polymerization method, and the like. The polymerizable liquid crystal composition contains a polymerizable compound. Examples of the polymerizable compound which can be used include a photopolymerizable monomer or the like in which polymerization progresses by an energy ray such as light.

Specifically, a bifunctional monomer denoted by General Formula (II) shown below is preferable.

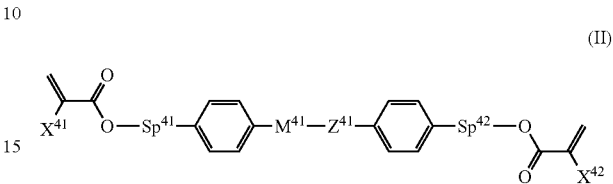

(II)

(In the formula, $X^{41}$ and $X^{42}$ each independently represent a hydrogen atom or a methyl group, $Sp^{41}$ and $Sp^{42}$ each independently represent a single bond, an alkylene group having 1 to 8 carbon atoms, or —O—$(CH_2)$s— (in the formula, s represents an integer of 2 to 7, and an oxygen atom is bonded to an aromatic ring), $Z^{41}$ represents —OCH$_2$—, —CH$_2$O—, —COO—, —O—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (in the formula, $Y^1$ and $Y^2$ each independently represent a fluorine atom or a hydrogen atom), —C≡C—, or a single bond, $M^{41}$ represents a 1,4-phenylene group, a trans-1,4-cyclohexylene group, or a single bond, and in all of the 1,4-phenylene groups of the formula, an arbitrary hydrogen atom may be substituted with a fluorine atom.)

A diacrylate derivative in which both of $X^{41}$ and $X^{42}$ represent a hydrogen atom and a dimethacrylate derivative in which both of $X^{41}$ and $X^{42}$ have a methyl group are preferable, and a compound in which one of $X^{41}$ and $X^{42}$ represents a hydrogen atom, and the other has a methyl group is also preferable. In a polymerization rate of the compound, a polymerization rate of the diacrylate derivative is the fastest, a polymerization rate of the dimethacrylate derivative is the slowest, and a polymerization rate of an asymmetrical compound is between the polymerization rates of the diacrylate derivative and the dimethacrylate derivative, and a preferred aspect can be used according to the application.

$Sp^{41}$ and $Sp^{42}$ each independently represent a single bond, an alkylene group having 1 to 8 carbon atoms, or —O—$(CH_2)$s-, and in a PSA display element, it is preferable that at least one of $Sp^{41}$ and $Sp^{42}$ be a single bond, and a compound in which both of $Sp^{41}$ and $Sp^{42}$ represent a single bond or aspect in which one of $Sp^{41}$ and $Sp^{42}$ represents a single bond, and the other represents an alkylene group having 1 to 8 carbon atoms or —O—$(CH_2)$s-. In this case, 1 to 4 alkyl groups are preferable, and s is preferably 1 to 4.

$Z^{41}$ preferably represents —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably represents —COO—, —OCO—, or a single bond, and particularly preferably represents a single bond.

$M^{41}$ represents a 1,4-phenylene group in which an arbitrary hydrogen atom may be substituted with a fluorine atom, a trans-1,4-cyclohexylene group, or a single bond, and preferably represents a 1,4-phenylene group or a single bond. When $M^{41}$ represents a ring structure other than a single bond, it is also preferable that $Z^{41}$ represent a linking group other than a single bond, and when $M^{41}$ represents a single bond, it is preferable that $Z^{41}$ represent a single bond.

From this viewpoint, in General Formula (II) described above, specifically, it is preferable that a ring structure between $Sp^{41}$ and $Sp^{42}$ have the following structure.

In General Formula (II) described above, when $M^{41}$ represents a single bond, and the ring structure is formed of two rings, the ring structure preferably represents General Formula (IIa-1) to General Formula (IIa-5) shown below, more preferably represents General Formula (IIa-1) to General Formula (IIa-3), and particularly preferably represents General Formula (IIa-1).

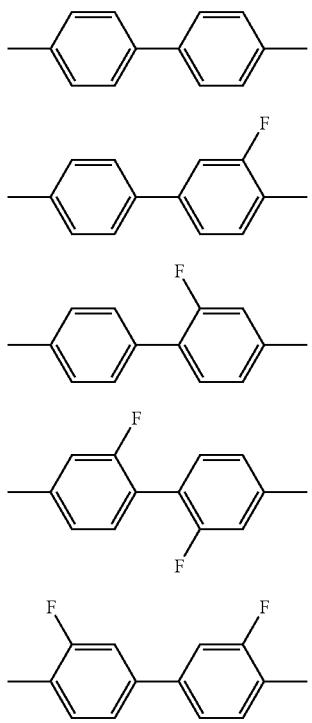

(In the formula, both terminals are bonded to $Sp^{41}$ and $Sp^{42}$.)

In a polymerizable compound having such a skeleton, an alignment-regulating force after polymerization is optimized for a PSA type liquid crystal display element, and an excellent alignment state can be obtained. Therefore, display unevenness is suppressed or does not occur.

As described above, compounds denoted by General Formula (II-1) to General Formula (II-4) shown below are particularly preferable as the photopolymerizable monomer, and among the compounds, a compound denoted by General Formula (II-2) shown below is most preferable.

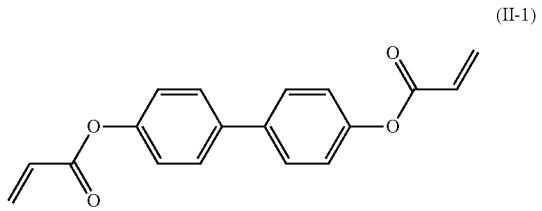

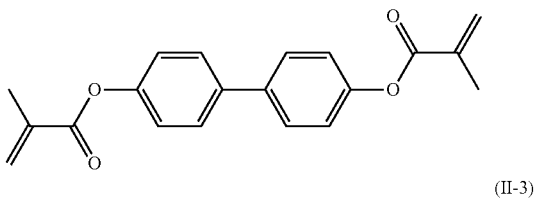

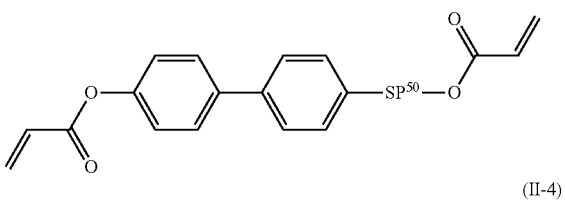

(In the formula, $Sp^{50}$ represents an alkylene group having 2 to 5 carbon atoms.)

When the photopolymerizable monomer is added to the polymerizable liquid crystal composition of the present invention and even the polymerization initiator does not exist, the polymerization progresses, but the polymerization initiator may be contained in order to accelerate the polymerization. Examples of the polymerization initiator include benzoin ethers, benzophenones, acetophenones, benzyl ketals, acyl phosphine oxides, and the like.

A polymerization operation of the polymerizable liquid crystal composition is simple in a case of a method of irradiating an active energy ray, and thus, a method is preferable in which photopolymerization is performed by irradiation of light such as an ultraviolet ray. In a case of photopolymerization, the photopolymerization may be performed by the same method as that in a case of preparing the alignment film by photopolymerization. The irradiation intensity of the ultraviolet ray is preferably in a range of 1 $W/m^2$ to 10 $kW/m^2$, and is particularly preferably in a range of 5 $W/m^2$ to 2 $kW/m^2$.

It is preferable that the polymerization of the polymerizable liquid crystal composition by heating be performed at a temperature at which the polymerizable liquid crystal composition exhibits a liquid crystal phase or a temperature lower than the temperature described above, and when a thermal polymerization initiator which discharges radicals by heating is used, it is particularly preferable that a thermal polymerization initiator of which a cleavage temperature is in the temperature range described above be used. In addition, it is possible to use the thermal polymerization initiator and the photopolymerization initiator in combination. The heating temperature also depends on a transition temperature from a liquid crystal phase to an isotropic phase of the polymerizable liquid crystal composition, and the heating is preferably performed at a temperature lower than a temperature at which heterogeneous polymerization occurs due to heat. The heating temperature is preferably 20° C. to 300° C., more preferably 30° C. to 200° C., and particularly preferably 30° C. to 120° C. In addition, for example, when a polymerizable group is a (meth)acryloyl oxy group, it is preferable that the heating be performed at a temperature lower than 90° C.

In the present invention, the optical axis of the optical anisotropic body can be adjusted by controlling the pretilt angle using the photo-alignment layer, and in order to set an angle of the optical axis with respect to the substrate surface to 0 degrees to 45 degrees, it is preferable that the pretilt angle be 0 degrees to 45 degrees, and in order to set the angle of the optical axis to the substrate surface to 45 degrees to 90 degrees, it is preferable that the pretilt angle be 45 degrees to 90 degrees.

Examples of a manufacturing step of the alignment film and the optical anisotropic body include the following methods.

A film formed of the photo-alignment material described above is prepared on the substrate, as a first step.

The film formed of the photo-alignment material is irradiated with light of greater than or equal to a threshold value of necessary light intensity in order to align a photo-responsive substance, at least the photo-responsive substance is aligned, alignment control is imparted to the film, and an alignment film is formed, as a second step.

A polymerizable liquid crystal composition film is prepared on the alignment film, as a third step.

The polymerizable liquid crystal composition film is polymerized, and an optical anisotropic body is formed, as a fourth step. At this time, in the fourth step, a polymerization reaction and a cross-linking reaction may simultaneously progress in the alignment film.

In addition, examples of another manufacturing method include the following methods.

A film formed of the photo-alignment material is prepared on a substrate, as a first step.

A polymerizable liquid crystal composition film is prepared on an alignment film, as a second step.

The film formed of the photo-alignment material and the polymerizable liquid crystal composition film is irradiated with light of greater than or equal to a threshold value of necessary light intensity in order to align a photo-responsive substance, at least the photo-responsive substance is aligned, alignment control is imparted to the film, and an alignment film is formed, as a third step.

The polymerizable liquid crystal composition film is polymerized, and an optical anisotropic body is formed, as a fourth step.

Furthermore, the third step and the fourth step may simultaneously progress. Accordingly, it is possible to reduce the number of steps.

By repeating the steps a plurality of times, it is possible to laminate the optical anisotropic body over a plurality of layers.

That is, the alignment film and the optical anisotropic body may be laminated on the optical anisotropic body after the optical anisotropic body is formed on the alignment film, or the optical anisotropic body may be further laminated after the optical anisotropic body is formed on the alignment film.

The optical anisotropic body having a plurality of optical anisotropic body layers obtained as described above can be used in applications such as simultaneously performing optical compensation of a liquid crystal layer and a polarizing plate of a liquid crystal display element, simultaneously performing optical compensation and brightness improvement of the liquid crystal layer of the liquid crystal display element, or simultaneously performing optical compensation and brightness improvement of the polarizing plate of the liquid crystal display element.

In addition, when only a specific portion is polymerized by ultraviolet irradiation using a mask and then an alignment state of an unpolymerized portion is changed over an electric field, a magnetic field, a temperature, or the like, and after that, the unpolymerized portion is polymerized, it is possible to obtain an optical anisotropic body including a plurality of regions of which alignment directions are different from each other.

In addition, even when the alignment of the polymerizable liquid crystal composition in an unpolymerized state is regulated in advance over the electric field, the magnetic field, the temperature, or the like at the time of polymerizing only the specific portion by the ultraviolet irradiation using the mask, and the polymerizable liquid crystal composition is polymerized by being irradiated with light from the mask while maintaining the state, it is possible to obtain an optical anisotropic body including a plurality of regions of which alignment directions are different from each other.

In order to stabilize solvent resistance and heat resistance of the obtained optical anisotropic body, it is possible to perform a heat-aging treatment with respect to the optical anisotropic body. In this case, it is preferable that heating be performed at a temperature higher than or equal to a glass transition point of the polymerizable liquid crystal composition film. In general, the heating temperature is preferably 50° C. to 300° C., more preferably 80° C. to 240° C., and particularly preferably 100° C. to 220° C.

The optical anisotropic body obtained by the steps described above can be used as a single optical anisotropic body by peeling off the optical anisotropic body layer from the substrate, and can be used as an optical anisotropic body in a state where the optical anisotropic body layer is not peeled off from the substrate. In particular, it is difficult for the optical anisotropic body to contaminate other members, and thus, the optical anisotropic body is useful at the time of being used as a laminated substrate or being used by being bonded to other substrates.

According to the photo-alignment method of the present invention, the photo-alignment material containing the photo-responsive substance having a threshold value of responding light intensity is irradiated with light having light intensity of greater than or equal to the threshold value, and the photo-responsive substance contained in the photo-alignment material is aligned. Accordingly, the photo-responsive substance is aligned to be parallel to the vibration direction of the light, and thus, it is possible to easily control the tilt angle of the alignment film.

EXAMPLES

Hereinafter, the present invention will be further described in detail with reference to examples, but the present invention is not limited to the examples.

Example 1

A tetrahydrofuran (THF) solution containing 5 mass % of a photo-responsive substance denoted by General Formula (III) shown below (oligothiophene TR5, manufactured by Merck KGaA) (a photo-alignment material (a)) was prepared.

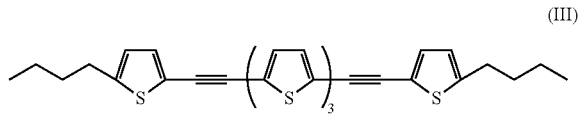

(III)

Next, one surface of a glass substrate attached with an ITO electrode was coated with the THF solution by spin coating, and then vacuum drying was performed at 40° C.

Next, the glass substrate coated with the photo-alignment material (a) was irradiated with argon ion laser light (a wavelength of 488 nm) from a direction perpendicular to the one surface of the glass substrate, and thus, a glass substrate (A) coated with the photo-alignment material (a) which had been subjected to light irradiation was obtained. In the irradiation of the argon ion laser light, the light intensity was 5 W/cm$^2$, and the irradiation time was 60 seconds.

Next, a liquid crystal cell was prepared by using two glass substrates (A), and by using the photo-alignment material (a) which had been subjected to the light irradiation as an alignment film. The two glass substrates (A) were bonded such that the surface coated with the photo-alignment material (a) which had been subjected to the light irradiation was arranged on the inner side and an interval between the two glass substrates (A) was 5 μm, and thus, a glass cell was prepared.

Next, the cell was filled with 4-cyano-4'-pentyl biphenyl denoted by General Formula (IV) shown below as a nematic liquid crystal at a temperature just higher than a transparent point, and cooling was performed to room temperature, and thus, a liquid crystal cell (1) of Example 1 was obtained.

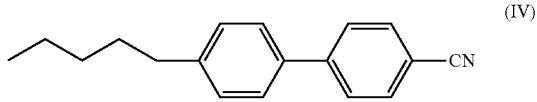

(IV)

The obtained liquid crystal cell (1) was observed with a polarization microscope (Product Name: Olympus BX50, manufactured by OLYMPUS CORPORATION), and thus, it was possible to confirm that liquid crystal molecules were horizontally aligned in a direction identical to a vibration surface of polarized light of the irradiated argon ion laser light, and it was found that a dye which had been subjected to light irradiation could be used as a material for aligning the liquid crystal molecules.

The liquid crystal cell (1) was interposed between two polarizing plates which were arranged in cross-nicol, and the alignment direction of the liquid crystal molecules was disposed in a direction of 45 degrees with respect to a polarization axis of the polarizing plate, and thus, the light was transmitted.

In addition, when an electric field was applied to the ITO electrodes of the two glass substrates (A) from the outside, the alignment direction of the liquid crystal molecules was changed, and thus, the light was not transmitted.

As described above, it was found that the liquid crystal cell (1) of Example 1 functioned as a liquid crystal display element using the photo-alignment material formed of the photo-responsive substance.

Example 2

In Example 2, a glass cell was prepared by the same method as that in Example 1 except that two substrates of a glass substrate on which a comb-like electrode (an ITO transparent electrode, Distance between Electrodes: 10 μm, and Electrode Width: 10 μm) was disposed and a glass substrate on which an electrode was not disposed were used instead of the glass substrate attached with the ITO electrode, the substrate was coated with a THF solution, and thus, a glass substrate (B1) on which the comb-like electrode coated with the photo-alignment material (a) which had been subjected to the light irradiation was disposed and a glass substrate (B2) on which the electrode coated with the photo-alignment material (a) which had been subjected to the light irradiation was not disposed were obtained.

In addition, a liquid crystal composition (LC7) having a composition denoted by General Formula (LC7) shown below,

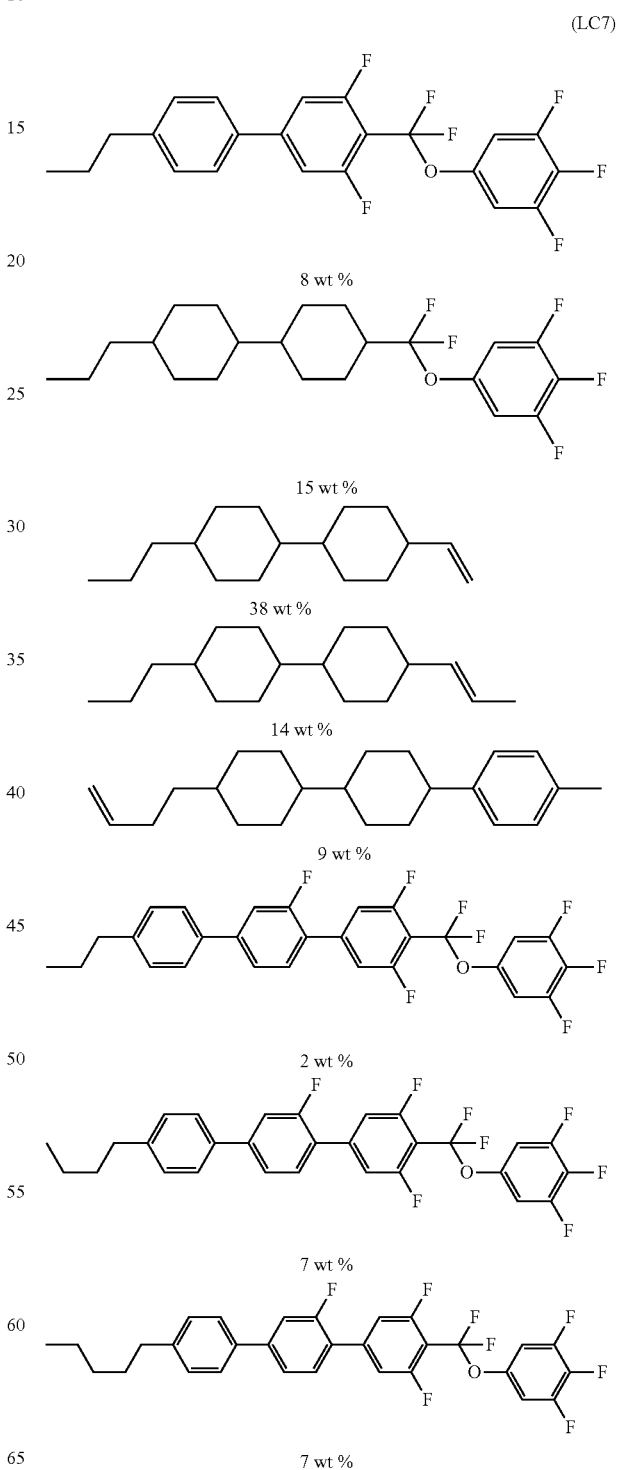

was prepared.

Next, the cell was filled with the liquid crystal composition (LC7) at a temperature accurately higher than a transparent point, and cooling was performed to room temperature, and thus, a liquid crystal cell (2) of Example 2 was obtained.

The obtained liquid crystal cell (2) was observed with a polarization microscope, and thus, it was possible to confirm that liquid crystal molecules were horizontally aligned in a direction identical to a vibration surface of polarized light of the irradiated argon ion laser light, and it was found that a dye which had been subjected to light irradiation could be used as a material for aligning the liquid crystal molecules.

The liquid crystal cell (2) was interposed between two polarizing plates which were arranged in cross-nicol, and the alignment direction of the liquid crystal molecules was disposed in a direction of 45 degrees with respect to a polarization axis of the polarizing plate, and thus, the light was transmitted.

In addition, when an electric field was applied between the ITO electrodes from the outside, the alignment direction of the liquid crystal molecules was changed, and thus, the light was not transmitted.

As described above, it was found that the liquid crystal cell (2) of Example 2 functioned as a liquid crystal display element using the photo-alignment material formed of the photo-responsive substance.

Example 3

One surface of a glass substrate attached with an ITO electrode was coated with a THF solution, and then vacuum drying was performed at 40° C., as with Example 1.

Next, the coated glass substrate was irradiated with argon ion laser light (a wavelength of 488 nm) from a direction at an oblique angle of 5 degrees with respect to a normal direction of the one surface of the glass substrate, and thus, a glass substrate (C) coated with the photo-alignment material (a) which had been subjected to light irradiation was obtained. In the irradiation of the argon ion laser light, the light intensity was 10 W/cm², and the irradiation time was 300 seconds.

Next, a liquid crystal cell was prepared by using two glass substrates (C). The two glass substrates (C) were bonded such that the surface coated with the photo-alignment material (a) which had been subjected to the light irradiation was arranged on the inner side, light irradiation directions were opposite to each other (anti-parallel), and an interval between the two glass substrates (C) was 5 μm, and thus, a glass cell was prepared.

In addition, a liquid crystal composition (LC8) having a composition denoted by General Formula (LC8) shown below, (LC8)

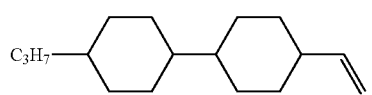
10wt%

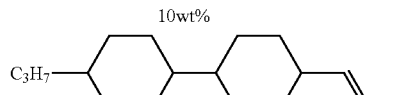
5wt%

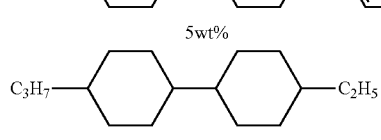
14wt%

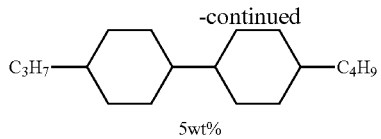
5wt%

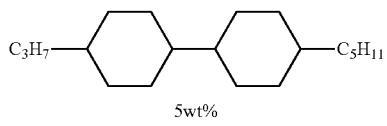
5wt%

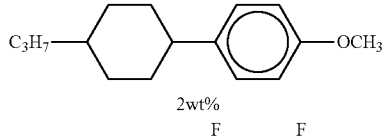
2wt%

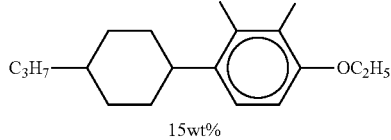
15wt%

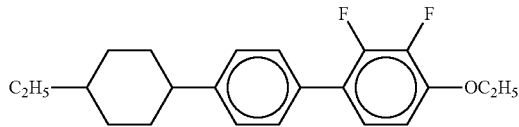
8wt%

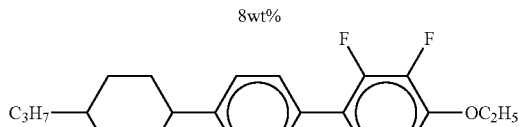
8wt%

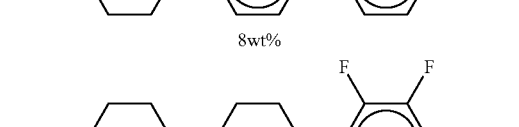
6wt%

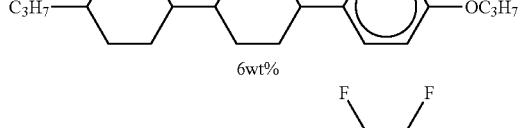
6wt%

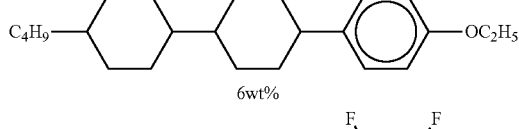
6wt%

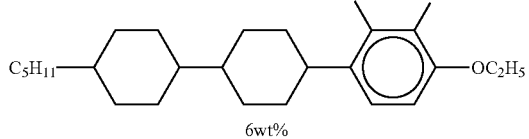
5wt%

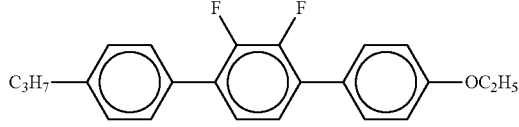
5wt% was prepared.

Next, the cell was filled with the liquid crystal composition (LC8) at a temperature accurately higher than a transparent point, and cooling was performed to room temperature, and thus, a liquid crystal cell (3) of Example 3 was obtained.

An oblique angle of the liquid crystal in the liquid crystal cell was optically measured by a crystal rotation method, and thus, the oblique angle was 88 degrees. Accordingly, it was found that the liquid crystal cell (3) of Example 3 had a fine oblique angle from the normal direction of the one surface of the glass substrate which was necessary for a perpendicular alignment mode.

The liquid crystal cell was interposed between two polarizing plates which were arranged in cross-nicol, and thus, a dark field was obtained.

In addition, when an electric field was applied to the ITO electrodes of the two glass substrates (C) from the outside, the alignment direction of the liquid crystal molecules was changed, and thus, the light was not transmitted.

As described above, it was found that the liquid crystal cell (3) of Example 3 functioned as a liquid crystal display element using the photo-alignment material formed of the photo-responsive substance.

Synthesis Example 1

(Preparation of Polymerizable Liquid Crystal Composition (LC-A))

15 parts by mass of a compound denoted by General Formula (V) shown below, and

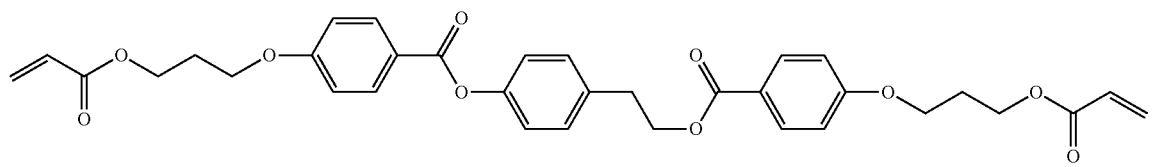

(V)

15 parts by mass of a compound denoted by General Formula (VI) shown below,

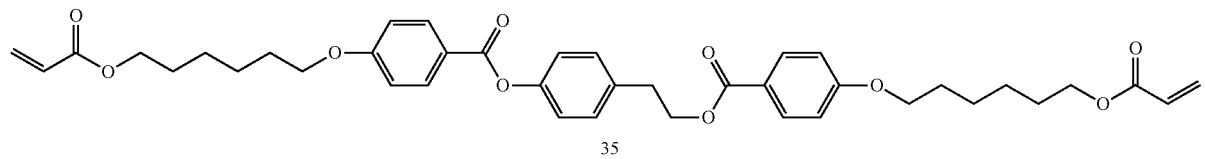

(VI)

were dissolved in 70 parts by mass of xylene, and then, 1.2 parts by mass of a photopolymerization initiator (Product Name: Irgacure 907, manufactured by BASF SE) and 0.3 parts by mass of an acrylic copolymer denoted by General Formula (VII) shown below,

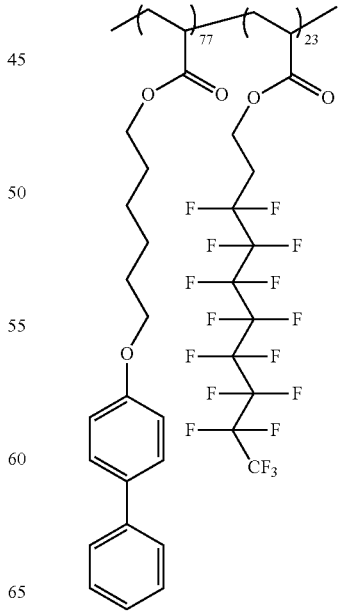

(VII)

were added thereto, and thus, a solution was prepared.

The obtained solution was filtered with a membrane filter of 0.45 μm, and thus, a polymerizable liquid crystal composition (LC-A) was obtained.

Example 4

In Example 4, a glass substrate (D) coated with the photo-alignment material (a) which had been subjected to the light irradiation by the same method as that in Example 1 except that a glass substrate on which the ITO electrode was not disposed was used.

Next, an optical anisotropic body was manufactured by using the glass substrate (D), and by using the photo-alignment material (a) which had been subjected to the light irradiation as an alignment film. The surface of the glass substrate (D) coated with the photo-alignment material (a) which had been subjected to the light irradiation was coated with a polymerizable liquid crystal composition (LC-A) by spin coating, and drying was performed at 80° C. for 1 minute.

Next, the polymerizable liquid crystal composition (LC-A) applied onto the glass substrate (D) was irradiated with an ultraviolet ray of 1 J/cm$^2$ under a nitrogen atmosphere, and the polymerizable liquid crystal composition (LC-A) was polymerized, and thus, an optical anisotropic body (1) was obtained.

The alignment direction of the obtained optical anisotropic body (1) was observed with a polarization microscope, and thus, it was confirmed that horizontal (homogeneous) alignment was obtained. Thus, it was found that an optical anisotropic body could be prepared in which homogeneous alignment of the liquid crystal was fixed.

Synthesis Example 2

(Preparation of Polymerizable Liquid Crystal Composition (LC-B))

43 parts by mass of a compound denoted by General Formula (V) described above, 43 parts by mass of a compound denoted by General Formula (VI) described above, and 14 parts by mass of a compound denoted by General Formula (VIII) shown below,

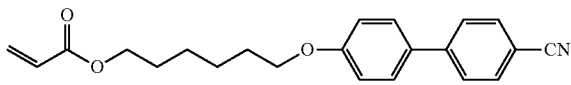

(VIII)

were dissolved in 70 parts by mass of propylene glycol monomethyl ether acetate, and then 2 parts by mass of a photopolymerization initiator (Product Name: Irgacure 651, manufactured by BASF SE) was added thereto, and thus, a solution was prepared. The obtained solution was filtered with a membrane filter of 0.45 μm, and thus, a polymerizable liquid crystal composition (LC-B) was obtained.

Example 5

In Example 5, a glass substrate (E) coated with the photo-alignment material (a) which had been subjected to the light irradiation was obtained by the same method as that in Example 3 except that a glass substrate on which an ITO electrode was not disposed was used.

Next, an optical anisotropic body was prepared by using the glass substrate (E), and by using the photo-alignment material (a) which had been subjected to the light irradiation as an alignment film. The surface of the glass substrate (E) coated with the photo-alignment material (a) which had been subjected to the light irradiation was coated with a polymerizable liquid crystal composition (LC-B) by spin coating, and vacuum drying was performed at 80° C. for 1 minute.

Next, the polymerizable liquid crystal composition (LC-B) applied onto the glass substrate was irradiated with an ultraviolet ray of 1 J/cm$^2$ under a nitrogen atmosphere, the polymerizable liquid crystal composition (LC-B) was polymerized, and thus, an optical anisotropic body (2) was obtained. The alignment direction of the obtained optical anisotropic body (2) was observed with a polarization microscope, and thus, it was confirmed that perpendicular (homeotropic) alignment was obtained. Thus, it was found that an optical anisotropic body could be prepared in which homeotropic alignment of the liquid crystal was fixed.

Synthesis Example 3

(Preparation of Polymerizable Liquid Crystal Composition (LC-C))

A mixture (MC-C) of 43 mol % of polymerizable liquid crystal denoted by General Formula (IX) shown below,

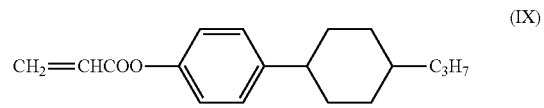

(IX)

37 mol % of a polymerizable liquid crystal denoted by General Formula (X) shown below, and

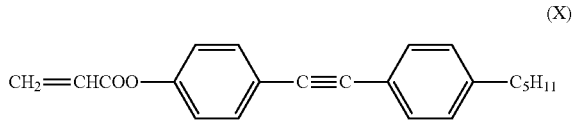

(X)

20 mol % of a compound denoted by General Formula (XI) shown below,

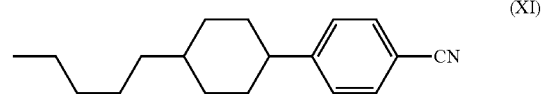

(XI)

was prepared.

Next, 99.4 mol % of the mixture (MC-C) and 0.1 mol % of a dye denoted by General Formula (III) described above (oligothiophene TR5, manufactured by Merck KGaA) (a photo-responsive substance) were dissolved in THF, and then, 0.5 mol % of a photopolymerization initiator (Product Name: Irgacure 907, manufactured by BASF SE) was added and mixed, vacuum drying was performed at 40° C., and thus, a polymerizable liquid crystal composition (LC-C) (a photo-alignment material (b)) containing the dye was obtained.

Example 6

A glass cell having a thickness of 10 μm using a glass substrate on which an ITO electrode was disposed and a glass substrate on which the electrode was not disposed was filled with the polymerizable liquid crystal composition (LC-C).

Next, the glass cell was irradiated with argon ion laser light (a wavelength of 488 nm) from a direction perpendicular to one surface of the glass cell such that the argon ion laser light was even with respect to the entire glass cell and a vibration surface of polarized light of the laser light was directed towards a predetermined direction. In the irradiation of the argon ion laser light, the light intensity was 5 W/cm$^2$, and the irradiation time was 60 seconds. The glass cell after the laser light irradiation was observed using a polarization microscope, and thus, it was confirmed that liquid crystal molecules were horizontally aligned in a direction identical to the vibration surface of the polarized light of the argon ion laser light.

Next, the entire glass cell was irradiated with an ultraviolet ray of 1 J/cm$^2$, and the polymerizable liquid crystal composition (LC-C) was polymerized, and thus, the alignment of the liquid crystal molecules was fixed.

After that, in the glass cell, the glass substrate on which the electrode was not disposed was peeled off, and thus, a glass substrate (F) was obtained in which the alignment of the polymerizable liquid crystal molecules was fixed in a state of being induced.

Next, a liquid crystal cell was prepared by using two glass substrates (F), and by using a polymerizable liquid crystal composition film fixed to the glass substrate as an alignment film. The glass cell was prepared by the same method as that in Example 1 using the two glass substrates (F), the cell was filled with 4-cyano-4'-pentyl biphenyl denoted by General Formula (IV) described above as a nematic liquid crystal at a temperature accurately higher than a transparent point, and then, cooling was performed to room temperature, and thus, a liquid crystal cell (4) of Example 6 was obtained.

The obtained liquid crystal cell (4) was observed with a polarization microscope, and thus, it was confirmed that the liquid crystal molecules were horizontally aligned in a direction identical to the vibration surface of the polarized light of the irradiated argon ion laser light.

The liquid crystal cell (4) was interposed between two polarizing plates which were arranged in cross-nicol, and the alignment direction of the liquid crystal molecules was disposed in a direction of 45 degrees with respect to a polarization axis of the polarizing plate, and thus, the light was transmitted.

In addition, when an electric field was applied to the ITO electrodes of the two glass substrates (F) from the outside, the alignment direction of the liquid crystal molecules was changed, and thus, the light was not transmitted.

As described above, it was found that the liquid crystal cell (4) of Example 6 functioned as a liquid crystal display element.

Example 7

In Example 7, a glass substrate (G) was obtained in which the alignment of the polymerizable liquid crystal molecules was fixed in a state of being induced by the same method as that in Example 6 except that a glass substrate on which an ITO electrode was not disposed was used.

Next, an optical anisotropic body was prepared by using the glass substrate (G), and by using the fixed polymerizable liquid crystal composition film as an alignment film. The surface of the glass substrate (G) including the polymerizable liquid crystal composition film was coated with the polymerizable liquid crystal composition (LC-A) by spin coating, and then, drying was performed at 80° C. for 1 minute.

Next, the polymerizable liquid crystal composition (LC-A) applied onto the glass substrate was irradiated with an ultraviolet ray of 1 J/cm$^2$ under a nitrogen atmosphere, and the polymerizable liquid crystal composition (LC-A) was polymerized, and thus, an optical anisotropic body (3) was obtained. The alignment direction of the obtained optical anisotropic body (3) was observed with a polarization microscope, and thus, it was confirmed that horizontal (homogeneous) alignment was obtained. Thus, it was found that an optical anisotropic body could be prepared in which homogeneous alignment of the liquid crystal was fixed.

INDUSTRIAL APPLICABILITY

The present invention can be used, for example, as a liquid crystal display element, a retardation lens, and a manufacturing method thereof.

The invention claimed is:

1. A liquid crystal display element, comprising:
a first substrate having a first alignment film,
a second substrate having a second alignment film, wherein the first substrate is opposed to the second substrate such that the first alignment film is opposed to the second alignment film,
a liquid crystal layer provided between the first alignment film and the second alignment film,
wherein at least one of the first alignment film and the second alignment film comprises a photo-responsive substance having a long axis direction thereof,
wherein the photo-responsive substance has a threshold value of a light intensity for aligning the photo-responsive substance,
wherein when the photo-responsive substance is irradiated with light having a light intensity equal to or greater than the threshold value, the long axis direction of the photo-responsive substance can be aligned parallel to a vibration direction of light,
wherein the threshold value of the light intensity is less than or equal to 10 W/cm$^2$.

2. A liquid crystal display element according to claim 1, wherein said at least one of the first alignment film and the second alignment film further comprises an oligomer and/or a polymer.

3. A liquid crystal display element according to claim 1, wherein said at least one of the first alignment film and the second alignment film further comprises an anisotropic substance.

4. A liquid crystal display element according to claim 1, wherein the photo-responsive substance is an anisotropic substance which does not cause a photochemical reaction.

5. An optical anisotropic body, comprising:
an alignment film comprising a photo-responsive substance having a long axis direction thereof; and
a polymerizable liquid crystal composition film,
wherein the photo-responsive substance has a threshold value of a light intensity for aligning the photo-responsive substance,
wherein when the photo-responsive substance is irradiated with light having a light intensity equal to or greater than the threshold value, the long axis direction of the photo-responsive substance can be aligned parallel to a vibration direction of light.

6. A liquid crystal display element according to claim 1, wherein said at least one of the first alignment film and the second alignment film consists of the photo-responsive substance.

* * * * *